(12) United States Patent
Fontdecaba Buj

(10) Patent No.: US 7,168,720 B2
(45) Date of Patent: Jan. 30, 2007

(54) SUSPENSION DEVICE FOR A MOTOR VEHICLE AND ITS IMPLEMENTATION

(75) Inventor: Josep Fontdecaba Buj, Molins de Rei (ES)

(73) Assignee: Creuat, S.L., Molins de Rei (ES)

( * ) Notice: Subject to any disclaimer, the term of this patent is extended or adjusted under 35 U.S.C. 154(b) by 0 days.

(21) Appl. No.: 10/793,932

(22) Filed: Mar. 8, 2004

(65) Prior Publication Data

US 2004/0169345 A1 Sep. 2, 2004

Related U.S. Application Data

(63) Continuation of application No. PCT/ES02/00419, filed on Sep. 6, 2002.

(30) Foreign Application Priority Data

Sep. 7, 2001 (ES) ................................ 200102021

(51) Int. Cl.
*B60G 21/06* (2006.01)
(52) U.S. Cl. ........................ 280/124.159; 280/124.106; 280/124.104
(58) Field of Classification Search ......... 280/124.104, 280/124.106, 124.158, 124.159, 5.505, 5.506, 280/5.507
See application file for complete search history.

(56) References Cited

U.S. PATENT DOCUMENTS

| | | | | |
|---|---|---|---|---|
| 2,184,202 A | * | 12/1939 | Tschanz | ............... 280/124.104 |
| 5,447,332 A | * | 9/1995 | Heyring | ............... 280/124.104 |
| 5,486,018 A | * | 1/1996 | Sakai | .................... 280/124.16 |
| 6,024,366 A | * | 2/2000 | Masamura | ........... 280/124.162 |
| 6,267,387 B1 | * | 7/2001 | Weiss | .................. 280/124.106 |
| 6,270,098 B1 | * | 8/2001 | Heyring et al. | ....... 280/124.104 |
| 2001/0024005 A1 | * | 9/2001 | Sakai | ....................... 267/64.28 |

FOREIGN PATENT DOCUMENTS

| | | |
|---|---|---|
| EP | 1 116 610 A2 | 7/2001 |
| WO | WO 9523076 A1 * | 8/1995 |
| WO | WO 00/47434 A1 | 8/2000 |

* cited by examiner

*Primary Examiner*—Ruth Ilan
(74) *Attorney, Agent, or Firm*—Sughrue Mion, PLLC

(57) ABSTRACT

Vehicle suspension system applicable to vehicles provided with rolling arrangements that have a resistance to the roll, pitch vertical rebound, and axle crossing movement such that allows a weight distribution on every rolling arrangement. The rolling arrangements are connected to a central device that is attached to the vehicle body. The central device includes elastic devices that receive the movements and forces originated in each rolling arrangement because of the weight variations and dynamic forces created when the vehicle is traveling. Vertical forces and movements detected in the vehicle wheels are transmitted to the central device through hydraulic and/or mechanical devices.

8 Claims, 27 Drawing Sheets

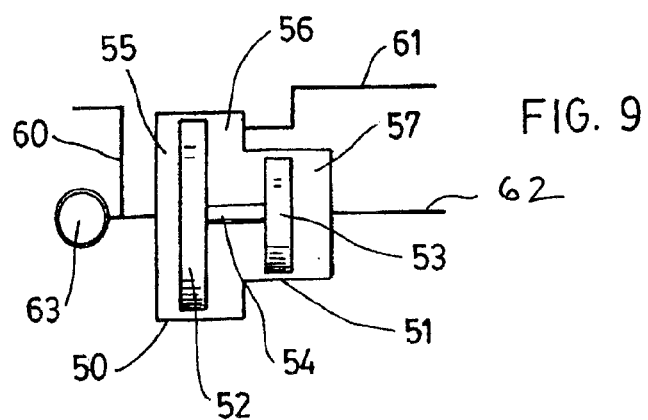
FIG. 9
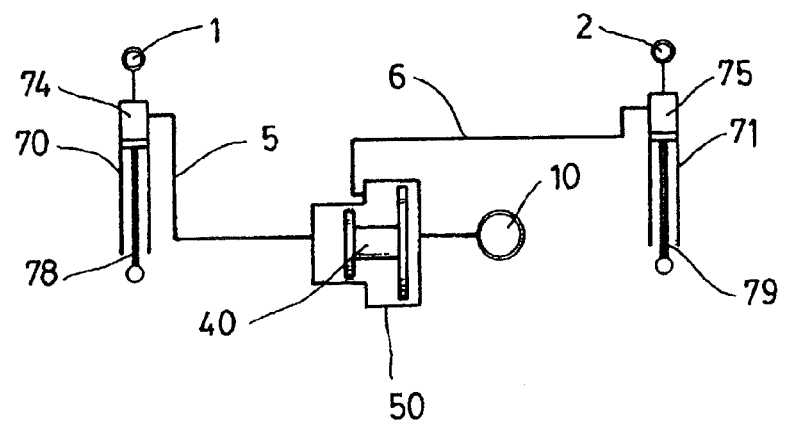
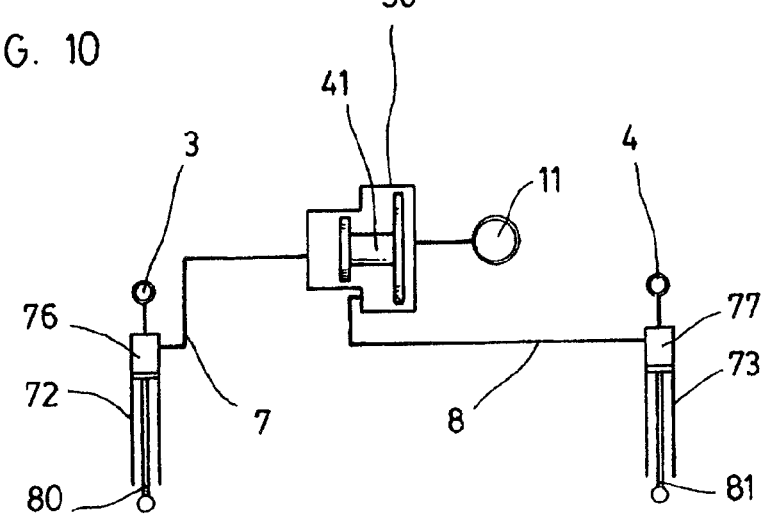
FIG. 10

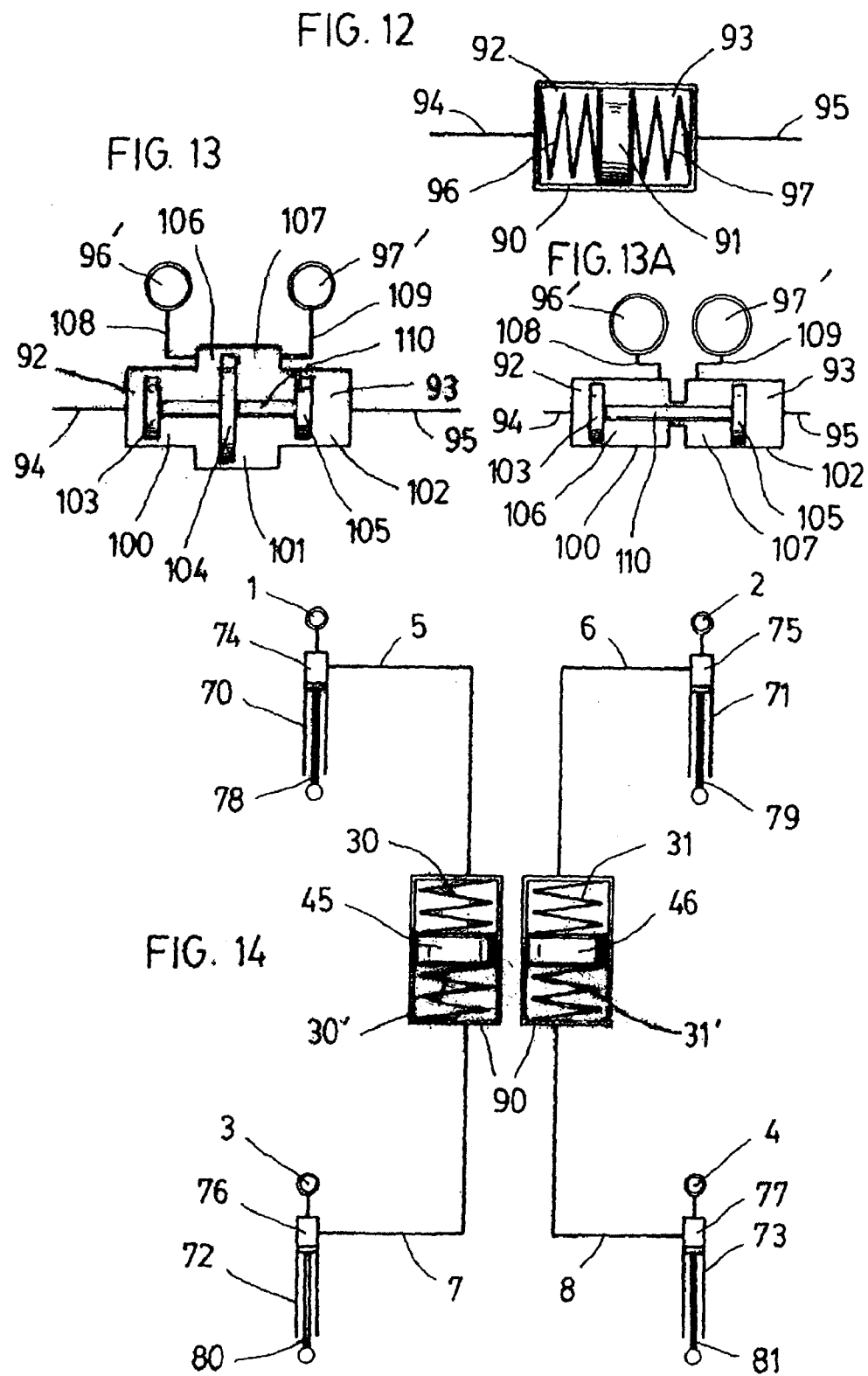

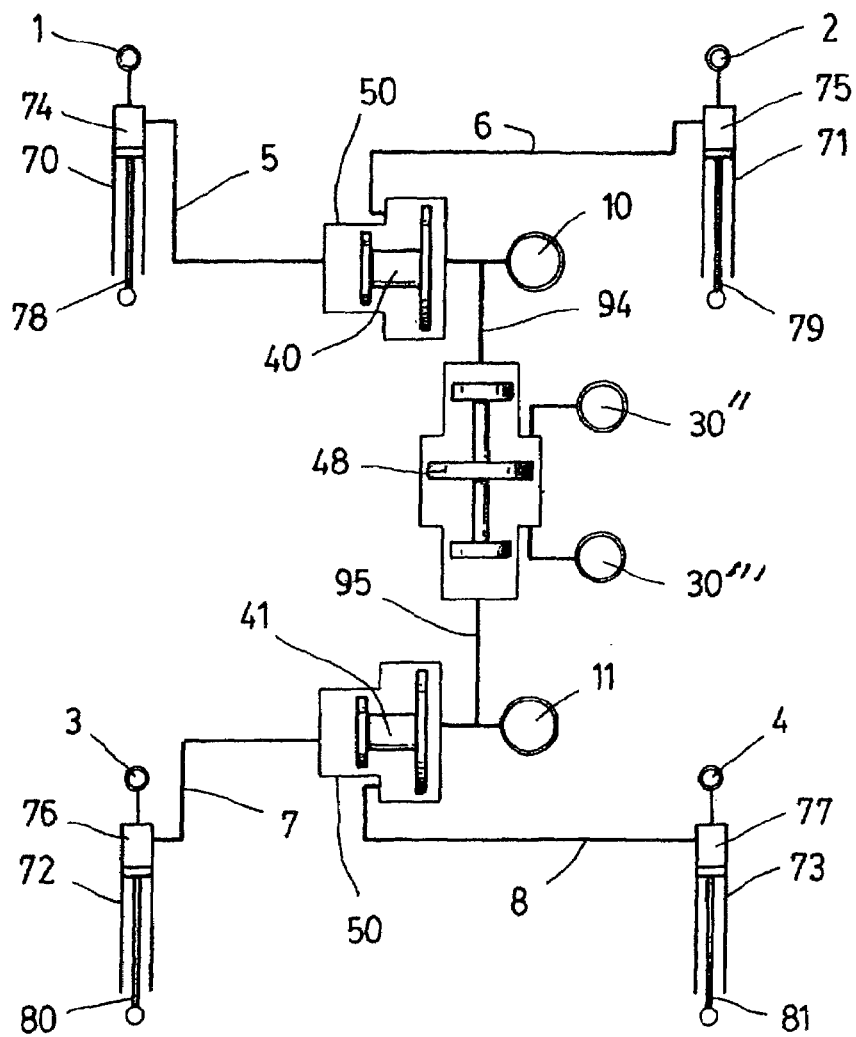

SUSPENSION DEVICE FOR A MOTOR VEHICLE AND ITS IMPLEMENTATION

This is a continuation of International Application No. PCT/ES02/00419, filed Sep. 6, 2002.

FIELD OF INVENTION

This invention refers to an integral suspension system for a vehicle and the necessary elements for its implementation, specifically a system applicable to vehicles provided with rolling arrangements in number of four, each placed in every corner of the vehicle and made of one or more wheels or elements such as crawler tracks that allow the movement in a horizontal direction, so cooperating with the suspension system or substituting it allows:

a) Absorb vibrations, shocks and surface unevenness where the vehicle moves, minimizing the effects of such perturbations on the vehicle body.
b) The rolling arrangements keep contact with the ground and evenly distribute the vehicle weight over such terrain.
c) Provide a design with the necessary resilient elements to obtain the desired stiffness against roll, pitch, vertical rebound movement and axle crossing.
d) Provide a design with the necessary damping elements to obtain the desired damping of roll, pitch, vertical rebound movement and axle crossing.

To meet such objectives, the system relates as schematically shown in FIG. 1 the vertical movements of each wheel or rolling arrangement in respect to the body of the vehicle in such a way that the forces and movements sensed in each wheel are transmitted to a central device CD that distributes the vehicle weight and properly combines the forces in each wheel as to properly absorb the terrain unevenness, allowing that the wheels keep contact with it, and do not induce undesired effects in the vehicle body when it runs on irregular terrains or the dynamic conditions create oscillations of it in respect to the ground.

Each wheel or rolling arrangement, from now on referred just as wheel, is provided with an associated system that provides the transmission means for its vertical movements in respect to the vehicle body onto the central device CD.

Such system includes resilient and damping elements that partially absorb the oscillations undergone by the wheel. Such elements provide a specific resiliency and damping for each wheel, is the movements of that wheel are partially isolated from the central device CD.

The resilient and damping elements can be located in the same transmission means, or separately between the wheel mount and the vehicle body. In particular, and because of the implied simplification, it is to be noted that resilient means can be located in the same transmission means, while the dampers are mounted between every wheel and the vehicle chassis. Nevertheless, and to obtain the best results, it is desirable that both the resilient and damping elements can be mounted in parallel and within the transmission means already mentioned.

The central device CD relates the four rolling arrangements vertical movements and is in charge of distributing the vehicle weight appropriately among them. This is why it is connected to the transmission means between each wheel and the central device CD.

The central device CD is also in charge of distributing the forces and oscillations received in each wheel among the others. This way it controls the vehicle at rest in FIG. 2, to experience rebound movements (FIG. 3) pitch (FIG. 4) roll (FIG. 5), pitch, and axle-crossing movements (FIG. 6). To accomplish this, it will be provided with elements capable of transmitting forces and movements, as well as resilient and damping elements to control, modulate and eventually dissipate the energy introduced by the vehicle travel.

The suspension system can be built with hydraulic, FIG. 7, or mechanical elements, FIG. 8, such that implement the previously described actions.

When hydraulic means are chosen, the vertical movements in each wheel are transmitted to simple effect hydraulic rams, which are connected to the central device CD through hydraulic conduits attached to the cavity defined in the hydraulic ram In this case, the central device CD has to be made of hydraulic components that can perform the hydraulic flow distribution among the wheels. In this case, the conduit that relates every wheel to the central device CD can be connected to hydro pneumatic expansion chambers to provide the necessary resilient and damping elements that are equivalent to the ones found in the mechanical implementation.

It is to be noted that the damping elements implementation becomes extremely simplified when these are included as restrictor valves in the connection to each expansion chamber.

When the mechanical elements are chosen, they have to be able to resist traction, compression and torsion efforts in order to properly transmit forces and movements. In this way, the vertical movements in each wheel are transmitted until the central device CD, and inside it, it will distribute the forces between wheels and between them and the vehicle body.

In the mechanical implementation, the elements can be relatively elastic so the transmission means already include the resiliency in them, while the damping means can be conventional hydraulic dampers.

STATE OF THE ART

Vehicle suspension is generally built with resilient elements that hold the vehicle weight connected between it and the wheel mountings or axles. In this way, the weight and the inertia forces are transmitted from it to the wheels, providing the means to absorb the shocks provoked by the vehicle travel over the surface irregularities.

Such resilient elements are usually put together with dampers, so part of the oscillations energy is absorbed, and they are extinguished in a reasonable period of time. In this way, we avoid prolonged oscillations that would impair the comfort and security of vehicle travel. Both the resilient elements and dampers are designed to minimize the movements and accelerations induced to the vehicle body when it travels over irregular surfaces or wavy paths In addition to absorb vibrations or shocks provoked by the rolling surface, suspension has to provide driving security, maintaining an optimum position of the vehicle in respect to the ground and the path chosen by the driver, specially when it travels along very sharp corners. Some of these aspects mainly depend on the suspension geometry, this is, the cinematic link between wheels and vehicle body, and therefore the position of each wheel in respect to the ground when the vehicle goes over obstacles and/or experiences dynamic movements of roll, pitch or rebound. Nevertheless, the characteristics of resilient and damping elements are responsible of the magnitude of such movements, and therefore the magnitude of the induced effects.

Vehicle stability is strongly related with the oscillations of the vehicle body along its path, or when it experiences roll, pitch or yaw movements. Wheel oscillations have to be absorbed to minimize the oscillations induced in the vehicle body, so it increases the stability and driving comfort.

Stabilizing bars are well known as the means to lessen the natural roll induced when driving a vehicle.

Most anti-roll systems use stabilizing bars provided with a certain resiliency quoeficient so the anti-roll effect increase is not a great comfort reduction, given that it would make the suspension stiffer.

If we design a vehicle with too soft anti-roll bars, they would not work properly when the vehicle takes sharp corners or at high speeds and a large centrifugal force is generated. In such cases, the vehicle body experiences a notorious roll, especially in all-terrain vehicles that have a high center of masses. Such roll increases the load transfer to exterior wheels, increasing the rollover risk as well as the loss of control of the vehicle when an inexperienced driver does incorrect maneuvers to correct the path.

On the contrary, if anti-roll bars are too stiff, they interfere with the suspension and deteriorate the comfort because the reaction to terrain obstacles is too stiff. Too stiff anti-roll bars also require powerful dampers, and lessen the traction in uneven terrains or in low-adherence situations (rain, snow, etc.)

We have knowledge of existing patents like the U.S. Pat. No. 3,992,026, where the torsion bars are arranged longitudinally along the vehicle, connected to the suspension arms, and interconnected among them. U.S. Pat. No. 5,505,479 where the front suspension arms are aligned between opposed front and rear wheels, and related through a resilient element arranged longitudinally with the purpose of transforming the vertical movements of the wheels in rotation movements when looking from the front, and the U.S. Pat. No. 5,882,017 where a perpendicular lever is connected to the vehicle body and a pair of articulated elements connect such lever to the front wheels, including a pair of travel limiters actuated selectively to connect the central part of the lever.

We also have knowledge of patent U.S. Pat. No. 3,147, 990 where vertical movements to torsion bars connected with the diagonally opposed wheel through mechanical means, as well as patent U.S. Pat. No. 2,840,387 where a leveling system is described where diagonally opposed wheels are connected through stays arranged in a cross way to force similar movements in both wheels, and about patents FR-1535641, U.S. Pat. No. 3,752,497 and U.S. Pat. No. 5,447,332 where diagonally opposed wheels are related to double effect hydraulic cylinders connected among them in a crossed way, where in the two last patents a central device CD that relates the four wheels through a double or triple cylinder where several pistons move together, and about patent WO-A-9523076 where the central device CD relates the hydraulic conduits arranged diagonally between double-effect rams to allow that wheels adapt to the terrain.

We further have knowledge of document EP 1.116.610 which refers to a specific arrangement of the dampers of an automobile, in which the dampers, a feature of the constitution thereof, have throttles at their pistons, and the document PCT WO 00/47434 which consists in a particular embodiment of automobile suspension which floats with respect to the vehicle chassis.

INVENTION SUMMARY

In general, vehicle suspension is designed to provide certain resiliency in its elements that allow certain movements of the vehicle body in respect to the ground such as roll, pitch and vertical rebound.

These three movements are three freedom degrees that permit the suspension articulations and geometry. Such geometry uses to be designed with a high degree of stiffness against efforts related to other degrees of freedom as the longitudinal or transversal displacements, and the yaw rotation forces.

While pitch and vertical rebound are commonly design together to adequate to the oscillation period most comfortable to the human being, the roll uses to require a larger stiffness that increases the own oscillation frequency. In this way, if the pitch and rebound own frequency is kept between 0.9 Hz and 1.5 Hz, the roll own frequency uses to be higher than these values because of the need to create the anti-roll effect which is needed for other aspects of the vehicle behavior.

Conventional anti-roll bars used to get this increase in the resistance of the suspension to the roll movement interfere up to certain degree with the existing suspension system. When they are too stiff, they increase the unevenness of weight distribution on the ground when it is irregular, and can easily make a wheel loose contact with the ground. This problem uses to be solved adopting a compromise where the stabilizing bars have such a resiliency that allows increasing the anti-roll without excessively impairing the capability of adaptation to uneven terrains. Compromise not always resolved satisfactorily.

At this point we would like to increase the anti-roll effect without geometrically interfering with the existing suspension, in a way that could cooperate with it or substitute it, and that could help to design an arbitrary roll resistance without impair the weight distribution in uneven terrains.

An additional problem if conventional suspensions provided with stabilizing bars is the relationship between the resistance to pitch with the resistance to vertical movements. In many cases, this is a minor problem because of an adequate weight distribution and the distance between axles. Nevertheless, it is obvious that additional devices should be added to modify the pitch resistance or the vertical rebound in a way that makes one independent from the other.

With all these premises it has been developed an integral suspension system for vehicles that, with the devices for its implementation conforms the object of this invention, consisting the system in an arrangement among the rolling arrangements that relates the vertical movements in respect to the vehicle body through interaction means that receive such vertical movements in each wheel and transmits them to a central device CD that adequate and distributes them to the other vehicle wheels in such a way that it maintains an even load distribution and controls the dynamics of the vehicle body in respect to the roll, pitch and vertical rebound movements.

The invention assumes that each wheel, group of wheels or rolling arrangement over which the vehicle can travel in contact with the ground, experiences vertical movements in respect with the vehicle body, which are transmitted to a central device CD in charge of relating the movements and forces experienced in each wheel, and to distribute the weight of the vehicle. The transmission of such forces and movements between wheels and central device CD can be made by mechanical, hydro pneumatic or electromechanical means, which have to be provided with resilient components and dampers such that, along with those in the central device CD, constitute the vehicle suspension.

According with the possibilities mentioned above for the implementation of the system, the invention includes several cases of devices for the implementation of the system.

In this invention, the vehicle suspension system includes some transmission means in charge of transmitting the vertical movements of each wheel to the central device CD. Such transmission will be built with rigid and resilient components able to resist the forces and provide a certain degree of resiliency that will be associated to each wheel in an individual way. Additionally it will be considered dampers that belong to the transmission means located, either between the wheel axle and the vehicle chassis, or in parallel with the resilient elements that are part of the transmission system.

The central device CD will be designed in such a way that it will be connected to the transmission means and receives the forces and movements of these, in a way that vertical movements experienced in the wheels are modeled and transmitted through the transmission systems to the central device CD.

The central device CD will be implemented through multiple links between the ends of the transmission means connected to it, one from each of the four wheels or group of them, located in each corner of the vehicle.

Having four transmission means, we confer four degrees of freedom. Such degrees can be reorganized to correspond with global movements of the wheels in respect to the vehicle body such as roll, pitch, vertical rebound and axle crossing. Then, the central device CD mission can be centered in:
  a) Provide certain stiffness to the roll, so that this is limited to the to the resiliency and damping elements placed in the transmission systems
  b) Provide certain elasticity to the pitch movement
  c) Provide certain elasticity to the vertical rebound movement
  d) Provide certain stiffness, elasticity or free movement to the axle crossing movement It is understood that the resiliency component associated to each movement will be the result of a given resiliency element, or the combination of two or more resiliency elements.

Each resiliency component associated to each of the movements has to be designed to offer the desired resistance to the vehicle own movements, such as the roll, pitch and vertical rebound.

The component associated to the axle crossing will determine the weight distribution over the ground when it is irregular and therefore whether the suspension is isostatic or has a certain degree of hiperstaticity.

Each resiliency element can be provided with a damper, so the central device CD brings certain damping effects to the roll, pitch, vertical rebound and axle crossing movements. Nevertheless, when the dampers are directly connected between wheels mountings and the vehicle chassis, it is not necessary to have them in the central device CD.

It is to be noted the importance of the combination of such resilient and damping elements located in the central device CD with those located in the transmission systems associated to each wheel. The roll, pitch and vertical rebound movements will be determined by such combination of transmission systems and central device CD.

There are several possibilities for the central device CD implementation depending on the components used for resilient elements and rigid elements. Among them we can mention:
  1) Central device CD rigid to roll. In this case, the roll is determined by the rigidity of the transmission systems. This may be the most common case because the usual thing is to aim for a larger rigidity to roll than for any other vehicle movement.
  2) Central device CD rigid or little resilient to pitch. In this case, the pitch is determined by the rigidity of the transmission systems. This case may be convenient for vehicles which stability is more important than comfort, and where it already behaves quite rigid to roll, such as special vehicles of considerable height.
  3) Central device CD rigid or little resilient to vertical movement. In this case, the vertical rebound is determined by the rigidity of the transmission systems. This may be convenient in vehicles which distance to the ground has to be maintained (all-terrain vehicles) or where the distance between axles requires that the pitch movement have an extra resiliency component. It is to be noted that the human being capacity to resist vertical accelerations is larger than the capacity to resist pitch movements, in such a way that with this characteristic we can obtain better performance regarding stability, less impairing the comfort for passengers
  4) Free Axle crossing. This provides the isostaticity, situation where the best weight distribution is obtained on irregular terrains. This case provides a smaller rigidity of the suspension when considering the independent movement of wheels, which can increase the comfort of the vehicle. Nevertheless, this option can create stability problems where the weight transfer caused by dynamic or static conditions is near the limit.

The invention includes mechanical and hydraulic solutions for building both the transmission systems as well as the central device CD. Both solutions are equivalent, providing a passive system that works according the same principles and working schemes.

When the hydraulic solution is chosen, each wheel is connected to simple effect hydraulic cylinders. Such cylinders have one cavity which volume varies in proportion to the vertical displacement of the corresponding wheel. In this way, the wheel movement is transformed into hydraulic flow. This flow is carried partially into an expansion chamber through a valve, and partially to the central device CD. It is to be desired that either the expansion chamber is connected close to the hydraulic cylinder, or to the cylinder itself in order to minimize hydraulic loses in the circuit given the large quantities of hydraulic flow to be made in relatively brief periods of time.

The central device CD for the hydraulic system receives the four conduits, one from each wheel or group of them, and it is built by hydraulic elements such as pipes, cylinders, restriction valves and hydro pneumatic expansion chambers, so the previously functions and purposes are implemented.

A characteristic of the hydraulic system is the use of hydraulic elements made of double pistons, each of a different area, that freely move inside cylinders of two diameters, creating three cavities, the larger one experiencing volume changes that are equal but contrary to the sum of volume changes in the other two cavities. This effect is used to create the same flow in two conduits, connecting the larger cavity to an expansion element, or another device that ends up creating two equal flows in the other two conduits.

This kind of device is used to relate the conduits of transversely and/or diagonally opposed wheels. In the first case, the resilient element that lessens the rigidity both to pitch and vertical rebound, while the second reduces only the vertical rebound. It is possible that combining both rigidities it provides the adequate suspension effect both for pitch and for vertical rebound.

In the devices connected in diagonal arrangement it can be included a conduit that connects the two larger chambers in each of the two devices, so the opposite movement of each diagonal set is allowed, obtaining an isostatic suspension configuration.

In the devices mentioned above, we can obtain the same or softer vertical rebound factor compared to pitch. To obtain a stiffer vertical rebound we can use devices provided with resilient elements that allow the flow in longitudinal way so they favor the pitch. Such devices have to allow a limited flow of hydraulic fluid, and the flow has to compress the resilient element in order to produce certain pressure differential that us proportional to the volume of fluid that has been transferred.

The invention foresees the use of cylinders provided with a piston that is connected to the cylinder through resilient elements. In this way, the displacement of the piston in any of the two directions compresses the resilient element and provides the required pressure differential.

Another possibility is the use of triple pistons, where the middle piston is of a larger diameter, that moves inside a cylinder with three diameters, and therefore it defines four cavities. The cavities at the ends can be connected to the conduits of the same side of the vehicle, while the other two middle cavities are connected each to hydro pneumatic expansion chambers, that are compressed or expanded when the triple piston moves.

There is still the possibility of connecting such triple piston between the two double piston devices that are connected transversely. In such a case, it favors the pitch. It even can combine the two systems by using a triple piston to substitute one of the double piston devices.

As indicated, the invention foresees the implementation of this system with mechanical elements. In this case, there are two modes, depending on how the forces are transmitted between the wheel and the central device CD.

It has been foreseen that in one case it is implemented with longitudinally arranged connection links. In this case, an angled lever transforms the wheel vertical movements into horizontal movements, so the connecting links can be arranged under the vehicle body. In this case, the resilient element can be located between the angled lever and the wheel, so it is the closest possible to the wheel, and reduces the mass of the elements that follow the wheel along its movements. At the end of the connecting link, and insides the central device CD, another angled lever can transform the longitudinal movements of the connecting links into transversal movements that are connected to central device CD internal elements.

In another case, the movement's transmission can be implemented through bars working under torsion. This case presents the double advantage that the same bars serve both to transmit the movement and as resilient element. In one end, the bar is connected to the suspension arm, and in the other, it has a small lever that transforms the bar rotation into horizontal movements inside the central device CD.

In both cases, the central device CD has to implement a combination of connections, in a way that the previously specified functions are performed.

In one hand, it has to relate the transversely opposed wheels, in a way that the parallel movement of them produces the compression of one resilient element, and the opposite movement is restricted. In the other hand, it has to relate the transversely opposed wheels in a way that their parallel movement produces the compression of other resilient elements and the opposed movement is restricted. Additionally, it will be able to allow the opposite movement of the diagonally opposed groups of wheels, so the adaptation to the terrain irregularities is maximized.

Both hydraulic and mechanical implementations include three types of resilient elements:

T: Transverse resilient elements. These resilient elements oppose to the parallel movement of the transversely opposed wheels. The central device CD contains rigid elements that oppose to the opposite movements in such wheels, so they oppose to the roll. Such resilient elements are indicated in all figures with numbers 10 and 11 when they act on front and rear axles separately, providing certain pitch capacity, and vertical rebound, and 12 when they act simultaneously providing only pitch.

X: Diagonally crossed resilient elements. Such resilient elements are opposed to the parallel movement of diagonally opposed wheels. The central device CD has rigid elements that oppose to the opposite movement in these wheels, so it opposes to the roll and pitch that the lack of such rigidity would allow. With such arrangement, the resilient elements provide some vertical rebound capacity, but not roll or pitch. Such resilient elements are indicated in all figures as elements 20 and 21 when they are connected separately to each diagonal arrangement, or 22 when there is a single element that is connected to both. We understand that an actuator, hydraulic or mechanical that varies the effective length of such resilient elements X would allow changes of the vehicle height in respect to the ground.

L: Longitudinal resilient elements. Elements arranged longitudinally that allow an increase of pitch capacity without altering the vertical rebound characteristic. Such resilient elements are indicated in the figures as elements 30 and 31 when they are mounted separately between each longitudinal arrangement, or 32 when a single element is mounted to both through other elements in the central device CD.

It is possible to combine the three types of elements described before to configure a suspension and obtain the desired resistance to pitch and vertical rebound. The use of X elements allow too the reduction or elimination of the opposition to axle crossing:

L-X: Preferable combination when it is interesting to easy the pitch of the vehicle while maintaining certain stiffness to the vehicle vertical rebound movement.

T-X: Adequate combination when it is interesting to reduce the vehicle pitch without making stiffer the vertical movement.

The invention system foresees a certain number of arrangements, some of them equivalent that are useful to implement the system. In the following text, we will describe some of them through the attached figures.

BRIEF DESCRIPTION OF FIGURES

FIG. 9, is a schematic representation of a central device CD made of a double piston of different diameters that can move inside a double cylinder, in a way that it determines three different cavities.

FIG. 10, is a schematic representation of a hydraulic implementation of this system where the central device CD is built with two elements as described in FIG. 9.

FIG. 12, is a schematic representation of a hydraulic device made with a simple piston linked to the cylinder by means of elastic elements that are compressed or elongated as the fluid moves the piston inside the cylinder.

FIGS. 13, and 13A, are a schematic representation of a hydraulic device that is equivalent to the one described in FIG. 12.

FIG. 14, is a schematic representation where the central device CD is made of two elements as the one described in FIG. 12 that are connected to conduits of the same side of the vehicle.

FIG. 16, is a schematic representation of a central device CD similar to the one in FIG. 15 where it uses the triple piston device shown in FIG. 13 instead of the simple piston shown in FIG. 12.

In FIG. 29, the dampers are mounted between the wheel support and the vehicle chassis, while in FIG. 30 they are mounted in parallel with the elastic elements that are part of the transmission means.

DETAILED DESCRIPTION OF FIGURES

Figure 1:
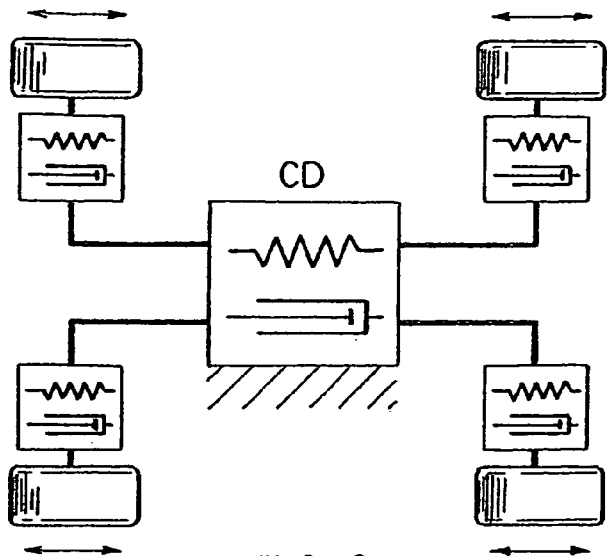
FIG. 1, is a schematic representation of the four wheels of a vehicle, the resilient elements of each of wheel, and the transmission means to the central device CD.

In FIG. 1, it is shown a scheme of the invented system applied to a four-wheel vehicle, where the vertical movements of each wheel are linked to the individual suspension elements, and from these, transmitted to the central device CD.

This central device CD is in charge of distributing the forces and movements originated in the wheels with the purpose of defining the vehicle global dynamics and to distribute its weight among the wheels.

Consequently, the central device CD has to provide the links that simultaneously connect the movements of the wheels in transversal, longitudinal and diagonal way, so they become connected to the vehicle body, and the vehicle weight be transmitted to the wheels.

The suspension components that are associated to every wheel movement are arranged as filters in relation to the movements and forces transmitted to the central device CD. This means that the rigidity of the elastic component and the damping component must be greater or equal than the component associated to any of the global movements of the vehicle, such as the vertical rebound, pitch and roll.

On the other side, the suspension components that are placed in the central device CD have to provide the additional elasticity to the movements that require a less rigid characteristic, such as the vertical rebound and pitch.

Additionally, the central device CD has to provide the free axle crossing with independence of the other characteristics and components of the suspension.

This independence is, in fact, the main advantage of centralizing the suspension characteristics, which would be difficult to attain otherwise.

Figure 2:
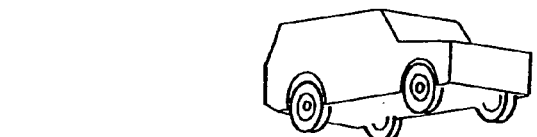
FIG. 2, is a schematic representation of a perspective view of a vehicle at rest.

In FIG. 2, it is shown a vehicle at rest, when there are no other forces acting on the wheels but for the vehicle weight itself.

Figure 3:
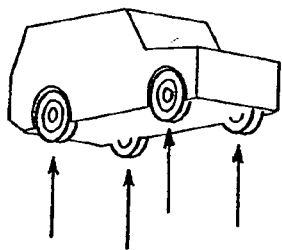
FIG. 3, represents the vehicle in previous figure under a vertical rebound movement.
Figure 4:
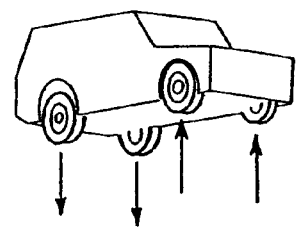
FIG. 4, represents the vehicle in FIG. 2 under a pitch movement.
Figure 5:
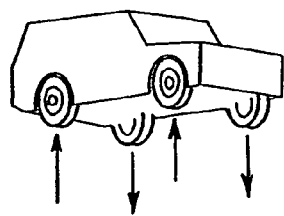
FIG. 5, represents the vehicle in FIG. 2 under a roll movement.
Figure 6:
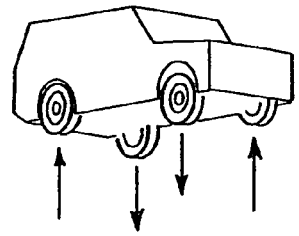
FIG. 6, represents the vehicle in FIG. 2 under an axle crossing movement.

When the vehicle is moving, we can see the following cases:

a.—Rebound movement, or vertical movement represented in FIG. 3, that we can define as a uniform movement of every wheel in respect to the vehicle body.

b.—Pitch movement, represented in FIG. 4, that we can define as the movement of each front wheel in the same direction and the rear wheels movement also in the same direction but contrary to the front wheels movement.

c.—Roll movement, represented in FIG. 5, that we can define as the movement of each wheel in one side in one direction, and the wheels from the other side in the same direction but contrary to the wheels in the other side.

d.—Axle crossing movement, represented in FIG. 6, that can be defined as the movement in different directions of each wheel of one side, opposed to the movements in the corresponding wheels of the other side, which move also in different directions.

Figure 7:
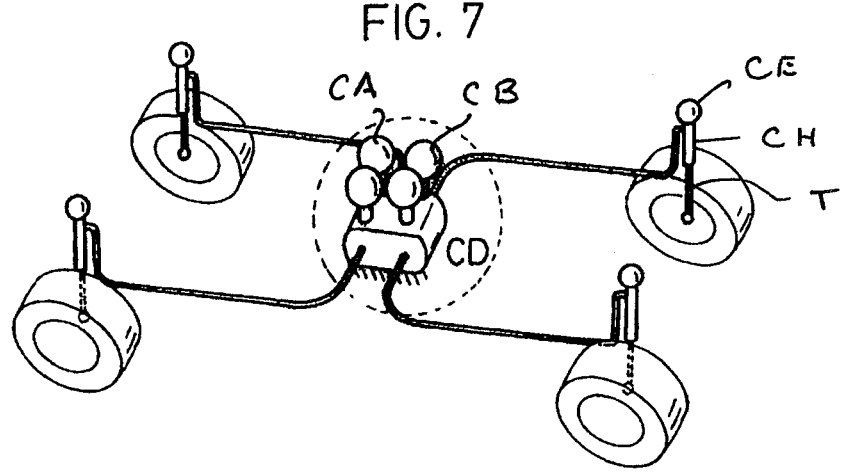
FIG. 7 is a perspective view of the elements in FIG. 1 following a hydraulic implementation of the invention.

FIG. 7 schematically represents the hydraulic representation of the invented system where we can see how each wheel is connected to the vehicle body by means of a hydraulic cylinder CH of simple effect that transmits the vertical movement of the wheel to the hydraulic fluid. These cylinders have the individual suspension elements made of hydropneumatic expansion chambers CE connected to the hydraulic circuit at a point near to each wheel.

Each hydraulic cylinder CH is connected to the central device CD through conduits T of the appropriate bore, which has the additional elastic elements made of hydropneumatic expansion chambers CA and CB that provide the global parameters of the suspension.

The hydropneumatic expansion chambers CE of the wheel hydraulic cylinders CH are appointed to provide the elasticity and damping for the roll movement, while the hydropneumatic expansion chambers CA from the central device CD provide the extra elasticity and damping needed for the pitch movement, and the hydropneumatic expansion chambers CB provide the extra elasticity and damping needed for the vertical movements, including that central device an isostatic valve.

Figure 8:
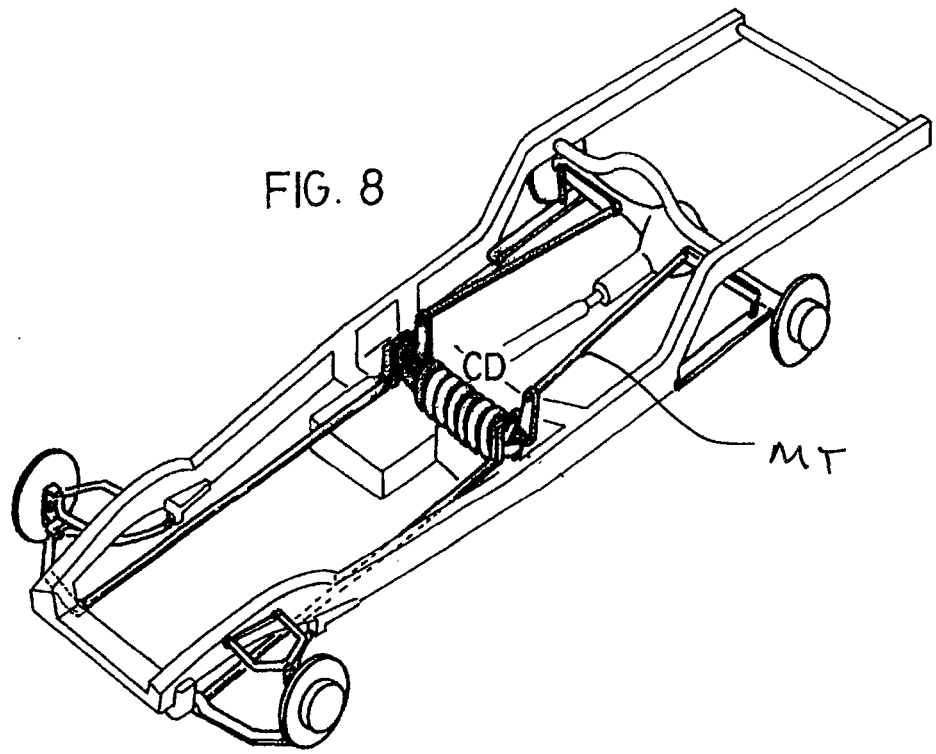
FIG. 8, is a perspective view of the elements in FIG. 1 following a mechanical implementation of the invention.

In FIG. 8 it is schematically represented a general mechanical implementation of the invented suspension system where it is seen how every vehicle wheel is individually connected to the transmission means MT that link the vertical movements of the wheels to the central device CD, which are made of levers and connecting links or by torsion bars.

FIG. 9 shows a device made of two concentric cylinders 50 and 51 of different diameters, linked together and closed on each end, inside of which there is a double piston made of two pistons 52 and 53 linked by the rod 54 in a way that the larger diameter piston 52 is inside the corresponding cylinder 50, and the smaller piston 53 inside the cylinder 51, in such a way that it determines three cavities inside the device, 55, 56 and 57.

These three cavities of the device are characterized by the fact that when the double piston 52–53 moves in its interior, the larger diameter end cavity 55 experiences a volume variation that is equal to the sum of volume variations experimented in the other two cavities 56 and 57 but inversed. Thereby we get that the volume variations in cavities 56 and 57 are always in the same sense, and of a value that is proportional to the relationship between the smaller piston area, and the difference between the areas of the larger diameter piston 52 and the smaller diameter piston 53.

Each cavity is connected to the exterior through the conduits 60, 61 and 62. The larger diameter end cavity 55 is also connected to the hydropneumatic expansion chamber 63. This chamber acts as an elastic element.

It is to be noted that this device behaves in a way that allows the flow in the conduits 61 and 62 always in the same sense and in a given ratio, so it behaves elastically to the flow together through 61 and 62, but opposes rigidly to the inverse flow. This behavior will be used later on in the hydraulic system layouts to achieve that the central device CD be rigid in respect to vehicle roll movements, and elastic to the other movements.

FIG. 10 shows a hydraulic suspension device made of four simple effect hydraulic cylinders 70, 71, 72 and 73 connected between the chassis and the wheels where each piston 78, 79, 80 and 81 defines one upper cavity 74, 75, 76 and 77 such as that this cavity volume varies proportionally to the movements of each wheel in respect to the vehicle body, and two double piston devices 40 and 41 such as the one described in FIG. 9 connected transversely to each cylinder through the hydraulic conduits 5, 6, 7 and 8 that are connected to the middle and smaller diameter end cavities in the double piston devices.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made by the two double piston devices 40 and 41. These have the larger diameter end cavity connected to a pneumatic expansion cavity 10 and 11 that provides the elasticity to the pitch and rebound movements, while it behaves rigid to roll. The Roll is then limited to the elasticity provided by the individual expansion chambers of each wheel 1, 2, 3 and 4. Each hydropneumatic cavity is also provided with a restricted flow valve designed to damp the oscillations of the circuit flow, and so dissipate part of the energy given or taken from the compression of the gas in its interior, damping in this way the oscillations of the vehicle body.

Figure 11:
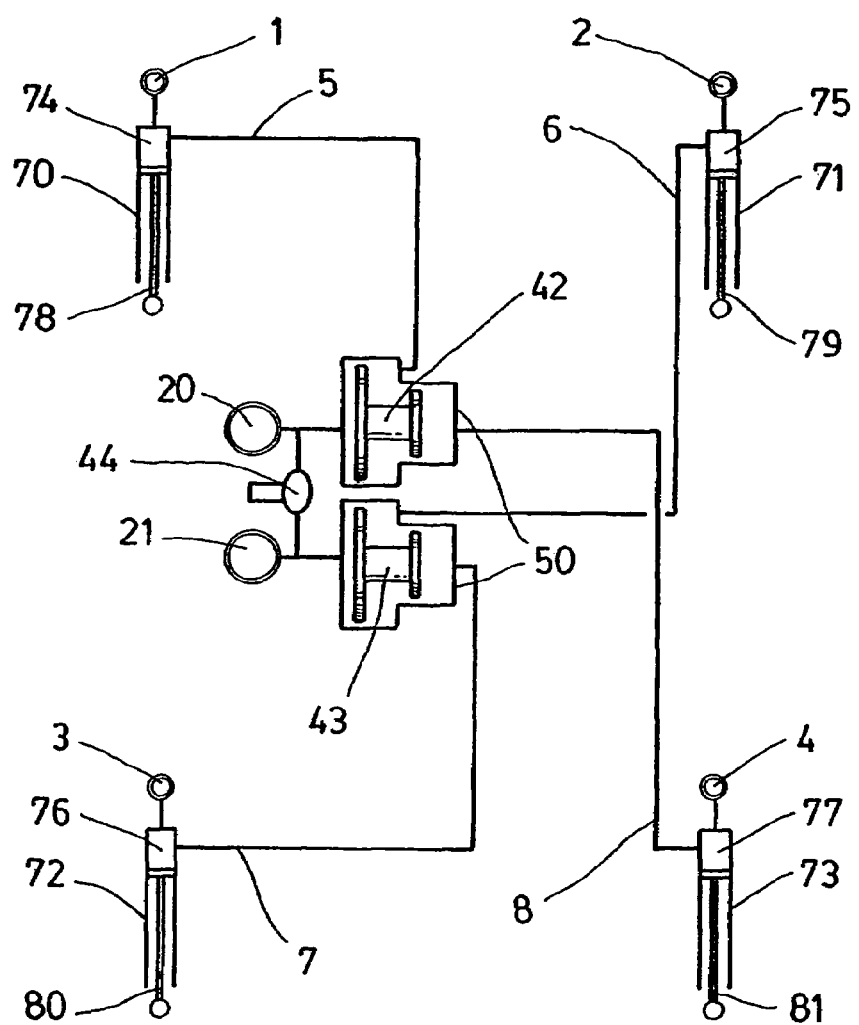
FIG. 11, is a schematic representation of a hydraulic implementation of the system where the central device CD is made with two elements as described in FIG. 9, connected to diagonally opposed wheels.

FIG. 11 shows a hydraulic suspension device made of four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, and two double piston devices 42 and 43 such as the one described in FIG. 9, connected diagonally to every cylinder through the hydraulic conduits 5, 6, 7 and 8 that are connected to the intermediate cavity and to the smaller diameter end cavity of such double piston devices. The larger diameter end cavities are also connected to each other through a valve 44 that can be opened or closed at will to provide isostaticity to the system.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made by the two double piston devices 42 and 43. These have the larger diameter end cavity connected to a pneumatic expansion cavity 20 and 21 that provides the elasticity to the rebound movements, while it behaves rigid to roll and pitch. The Roll and pitch are then limited to the elasticity provided by the individual expansion chambers of each wheel 1, 2, 3 and 4.

When this valve is closed, the adaptation to irregular terrains provides an irregular weights distribution, more irregular when the stiffer are the hydropneumatic chambers 20 and 21 are. When the valve is open, the system becomes isostatic because it allows the antiparallel movement of the two diagonal sets of wheels.

Each hydropneumatic cavity is also provided with a restricted flow valve designed to damp the oscillations of the circuit flow, and so dissipate part of the energy given or taken from the compression of the gas in its interior, damping in this way the oscillations of the vehicle body.

FIG. 12 shows a device made of a cylinder 90 that contains a piston 91, in a way that the piston is inside the cylinder closed on its ends, where it defines two cavities 92 and 93 inside which there are two elastic elements 96 and 97 that oppose to the movement of piston 91 inside the cylinder. In this way, when the piston moves inside the cylinder, the elastic elements make a force proportional and in opposite direction to the piston movement.

The cylinder chambers 92 and 93 are connected to the exterior through conduits 94 and 95, in a way that a pressure differential is created between the two conduits that is proportional to the volume of liquid transferred.

FIG. 13 shows a device made of a triple cylinder 100, 101 and 102 made of three concentric cylinders connected to each other and closed in the ends where the central cylinder 101 is of a larger diameter than the other two end cylinders, inside which there is a triple piston made of three pistons 103, 104 and 105 linked together by a common rod 110 in a way that the set of three pistons can freely move inside the set of three cylinders, inside which it determines four cavities 92, 108, 109 and 93 connected to the exterior through conduits 94, 108, 109 and 95.

The cavities 92 and 93 in the ends of the triple cylinder are connected to the suspension hydraulic circuit as in the device described in FIG. 12. Intermediate cavities 106 and 107 are connected to the expansion chambers 96 and 97 through conduits 106 and 107. In this way, when the triple piston moves, the volume of the end cavities 92 and 93 varies in opposite directions, and proportionally to the areas of the smaller diameter pistons, while there is a similar effect in the intermediate cavities, so the expansion chambers 96' and 97' get compressed or expanded proportionally to the movement of the triple piston, creating a force that opposes to its movement in a similar way as it happens in the device described in FIG. 12.

The chambers 92 and 93 in the cylinder are connected to the exterior through conduits 94 and 95, so a pressure differential is produced between the two conduits, proportional to the volume of liquid transferred.

FIG. 13A shows a device similar to the FIG. 13 where the functionality of the central cylinder is obtained by means of the same rod that links the end pistons, separating the cavities 106 and 107 through a wall, where the rod 110 can move through thanks of a seal inside such wall.

In this way, we keep defining four cavities, the two central ones 106 and 107 connected to the two hydropneumatic devices 96' and 97', and the two end cavities 92 and 93 to the hydraulic circuit in the same way as in the device described in FIG. 13.

FIG. 14 shows a hydraulic suspension device made of four simple effect hydraulic cylinders 70, 71, 72 and 73 connected between the chassis and the wheels, where the piston 78, 79, 80 and 81 define an upper cavity 74, 75, 76 and 77 such that it varies the volume proportionally to the movements of the wheels in respect to the vehicle body, and two simple piston devices 45 and 46 as the one described in FIG. 12, connected longitudinally between cylinders of the same side of the vehicle through hydraulic conduits 5, 6, 7 and 8 that are connected to the cavities at each end of the simple piston devices.

Each cylinder mounted between the vehicle body and the wheels has a hydropneumatic cavity 1, 2, 3 and 4 that is connected to the cylinder cavity 74, 75, 76 and 77, or to the conduit 5, 6, 7 and 8 that connects it with the central device CD. This hydropneumatic cavity provides the elastic component associated to every wheel.

In this figure, the central device CD is made by the two simple piston devices 45 and 46. Such devices have elastic elements 30–30' and 31–31' that provide elasticity to the pitch movements, while it behaves rigidly to roll and vertical movement. Therefore, roll and vertical rebound are limited to the elasticity that provide the individual expansion chambers of each wheel 1, 2, 3 and 4. Each hydropneumatic cavity, as well as the conduits connected to the simple piston devices 45, 46, are provided with flow restriction valve designed to damp the circuit flow oscillations, and this way dissipate the energy given or taken from the compression of the gas inside them, thus damping the oscillations of the vehicle body.

Figure 15:
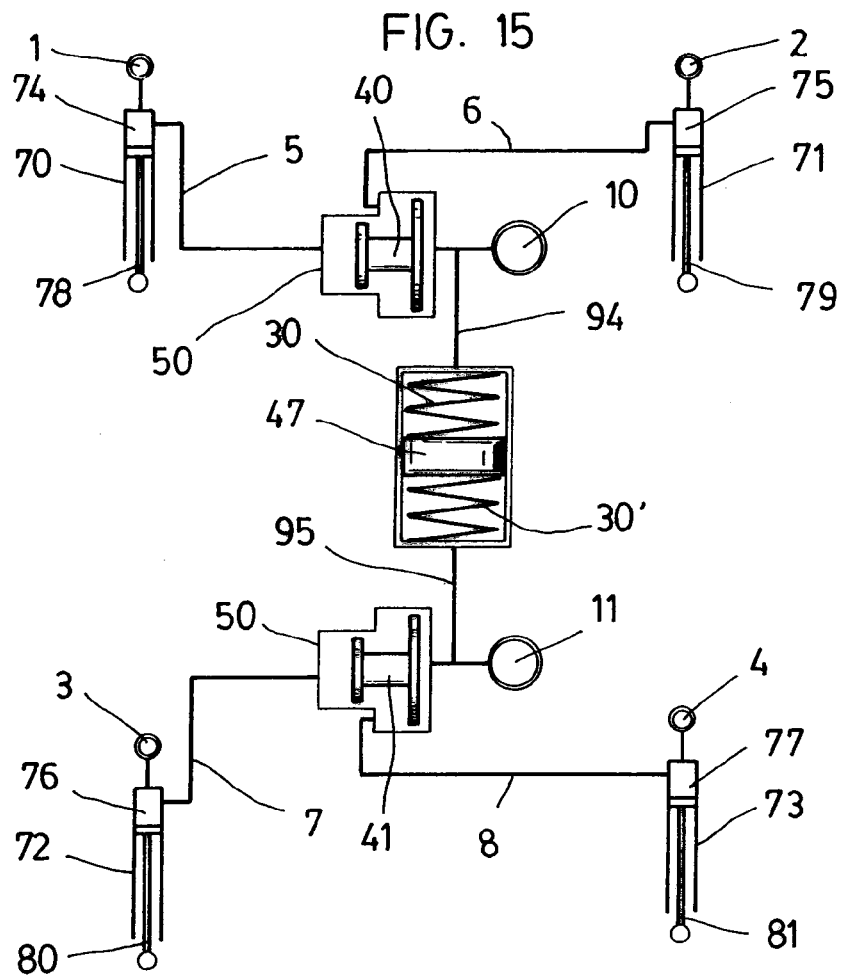
FIG. 15 is a schematic representation of the central device CD like in FIG. 10 where it is connected a device such as in FIG. 12.

FIG. 15 shows a hydraulic suspension device made of four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, and two double piston devices 40 and 41 such as the one described in FIG. 9 connected transversely to each cylinder through hydraulic conduits 5, 6, 7 and 8 that are connected to the intermediate chamber and the smaller diameter end chamber of the double piston devices.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made by the two double piston devices 40 and 41 and the simple piston device 47. The devices 40 and 41 have the larger diameter end cavity connected to a hydropneumatic expansion chamber 10 and 11 that provides elasticity to the pitch and rebound movements, while it behaves rigidly to roll. Such cavity in the larger diameter end is also connected to the ends of the simple piston device 47 through conduits 94 and 95 to provide an elastic component 30–30' only sensitive to pitch. Roll is therefore limited to the elasticity provided by the individual expansion chambers in each wheel 1, 2, 3 and 4. Each hydropneumatic chamber, as well as the conduits connected to the simple piston device 47 are also provided of a flow restriction valve designed to damp the oscillations of flow in the circuit, and then dissipate part of the energy given or taken from the compression of the gas inside, thus damping the oscillations of the vehicle body.

FIG. 16 shows a hydraulic suspension device made by four cylinders simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, and two double piston devices 40 and 41 as the one described in FIG. 9, connected transversely to each cylinder through the hydraulic conduits 5, 6, 7 and 8 that are connected to the intermediate and smaller diameter end cavities of the double piston devices.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made by the two double piston devices 40 and 41 and the triple piston device 48. The devices 40 and 41 have the larger diameter end cavity connected to a hydropneumatic expansion chamber 10 and 11 that provides elasticity to the pitch and rebound movements, while it behaves rigidly to roll. Such cavity in the larger diameter end is also connected to the ends of the triple piston device 48 through conduits 94 and 95 to provide an elastic component 30"–30''' only sensitive to pitch. Roll is therefore limited to the elasticity provided by the individual expansion chambers in each wheel 1, 2, 3 and 4. Each hydropneumatic chamber, as well as the conduits connected to the triple piston device 48 are also provided of a flow restriction valve designed to damp the oscillations of flow in the circuit, and then dissipate part of the energy given or taken from the compression of the gas inside, thus damping the oscillations of the vehicle body.

Figure 17:
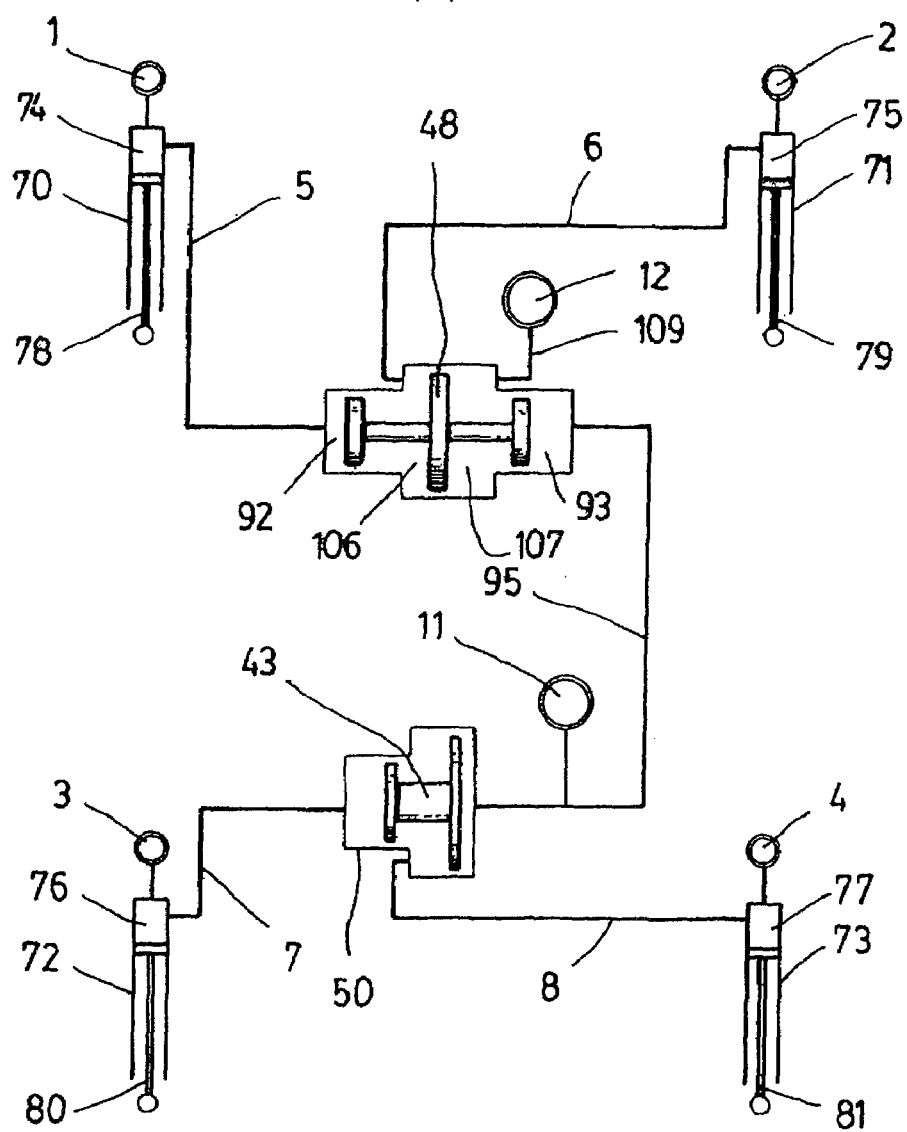
FIG. 17, is a schematic representation of a central device CD similar to the on in FIG. 8 where the triple piston device shown in FIG. 13 substitutes one of the double piston devices.

FIG. 17 shows a hydraulic suspension device made of four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, one triple piston device 48 such as the one described in FIG. 13, and a double piston device 43 such as the one described in FIG. 9 being the first connected to the two transversely opposed cylinders 70 and 71, and the second one to the other two 72 and 73, and both connected to each other.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is constituted by the two devices of triple and double pistons 48 and 43. The triple piston device 48 has the two cavities of one side 92 and 106 connected to the cylinders 70 and 71, the middle cavity of the other side 107 to an expansion chamber 12, and the cavity in the other end 93 connected to the double piston device 43 through the conduit 95. The double piston cavity 43 connects the larger diameter end to the conduit 95, and to an expansion chamber 11, while the other two cavities are connected to two transversely opposed cylinders 72 and 73.

In this central device CD, the two pneumatic expansion chambers 12 and 11 provide the elasticity to the rebound and pitch movements, while it behaves rigidly to roll. Roll is therefore limited to the elasticity provided by the individual expansion chambers in each wheel 1, 2, 3 and 4. Every hydropneumatic chamber as well as the conduit 95 that connects the two devices 48 and 43 are also provided with a flow restriction valve designed to damp the circuit flow oscillations, and thus dissipate part of the energy given or taken from the compression of the gas inside, thus damping the oscillations of the vehicle body.

Figure 18:
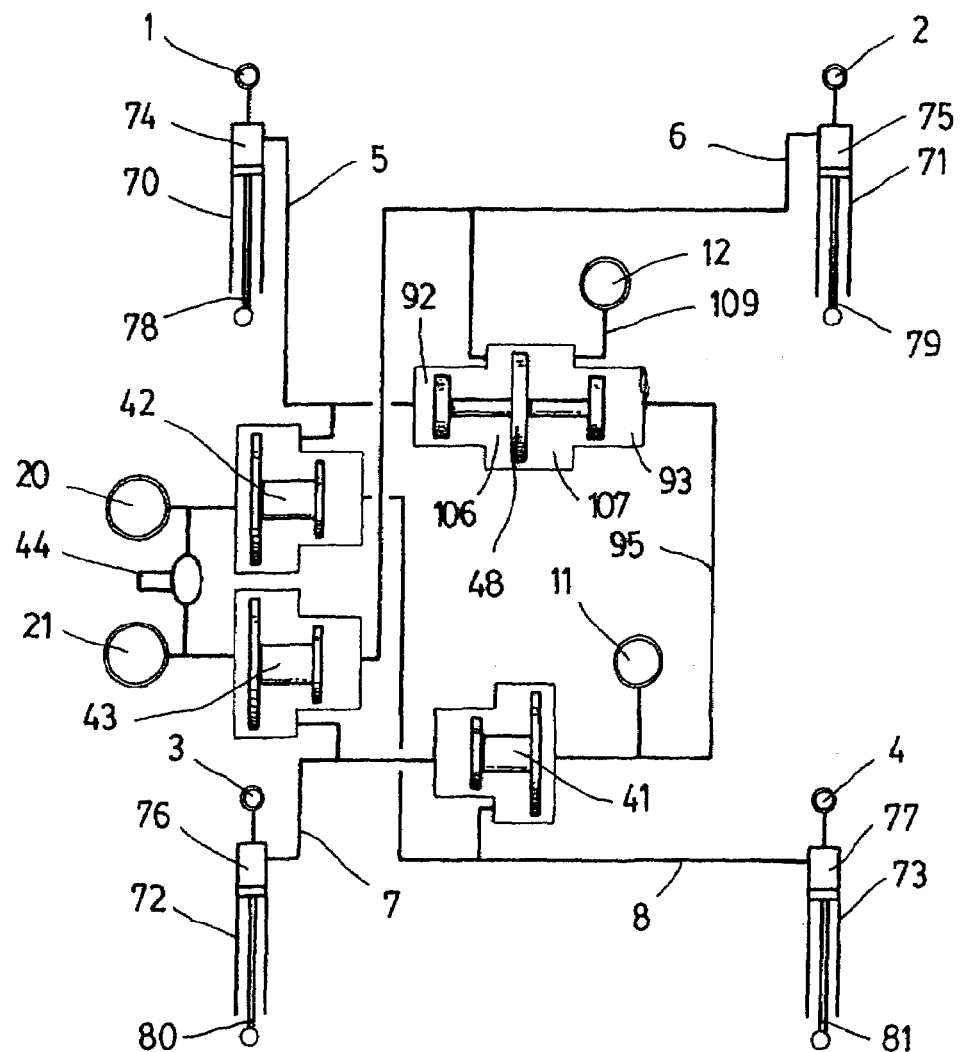
FIG. 18, is a schematic representation of the central device CD where it combines the two elements shown in FIGS. 11 and 17.

FIG. 18 shows a hydraulic suspension device where combines the central device CDs described in FIGS. 11 and 17.

This device is made by four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, one triple piston device 48 such as the one described in FIG. 13, and three double piston devices 41, 42 and 43 such as the one described in FIG. 9 being the first connected to the two transversely opposed cylinders 70 and 71, the second one to the other two 72 and 73, and both connected to each other, and the other two devices 42 and 43 connected respectively to every set of cylinders in each diagonal, one being he cylinders 70 and 73, and the other being the 71 and 72.

Each cylinder mounted between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made up by the device of triple piston 48 and the three double piston devices 41, 42 and 43.

The triple piston device 48 has the two cavities of one side 92 and 106 connected to the cylinders 70 and 71, the middle cavity of the other side 107 to an expansion chamber 12, and the cavity in the other end 93 connected to the double piston device 41 through the conduit 95. The double piston cavity 41 connects the larger diameter end to the conduit 95, and to an expansion chamber 11, while the other two cavities are connected to two transversely opposed cylinders 72 and 73.

The other two double piston devices 42 and 43 have the larger diameter end cavity connected to a pneumatic expansion chamber 20 and 21 that provide elasticity to rebound movements while it behaves rigidly to pitch and roll. Pitch and roll are therefore limited to the elasticity provided by the individual expansion chambers of each wheel 1, 2, 3 and 4.

When the valve 44 is closed, the adaptation to irregular terrains provides an irregular weights distribution, more irregular when the stiffer are the hydropneumatic chambers 20 and 21 are. When the valve is open, the system becomes isostatic because it allows the antiparallel movement of the two diagonal sets of wheels.

In this central device CD, the pneumatic expansion chambers 12 and 11 provide the elasticity to the pitch and rebound movements, while the expansion chambers 20 and 21 provide it only for the rebound movements. It is to be foreseen that chambers 20 and 21 can be suppressed if it is intended to make the system stiffer to rebound movement.

In any event this central device CD behaves rigidly to roll, thus being roll limited to the elasticity provided by the individual expansion chambers of each wheel 1, 2, 3 and 4. Every hydropneumatic chamber, as well as conduit 95 that connects the devices 49 and 41 are also provided with a flow restriction valve designed to damp the oscillations of the circuit flow, thus to dissipate part of the energy given or taken from the compression of the gas inside, thus damping the oscillations of the vehicle body.

Figure 19:
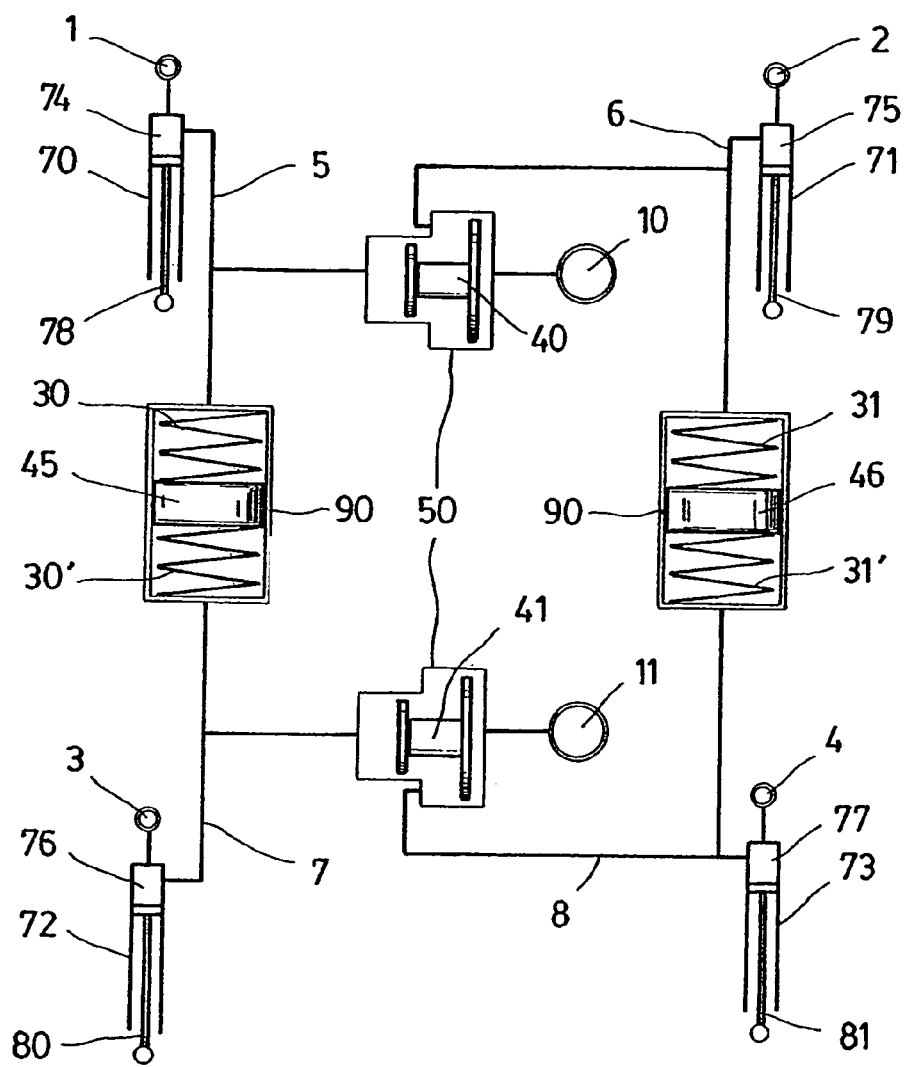
FIG. 19, is a schematic representation of the central device CD where it combines the two elements shown in FIGS. 10 and 14.

FIG. 19 shows a hydraulic suspension device where it over imposes the elements of central device CDs described in FIGS. 10 and 14.

This device is made by four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, two double piston devices 40 and 41 such as the one described in FIG. 9 transversely connected to each cylinders through conduits 5, 6, 7 and 8 that are connected to the intermediate and smaller diameter end cavities of the double piston devices, and two simple piston devices 45 and 46 such as the one described in FIG. 12 that is connected between the wheels of the same side of the vehicle through conduits 5 and 7 in one side, and 6 and 8 in the other side.

Each cylinder arranged between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made of the two double piston devices 40 and 41 and the two simple piston devices 45 and 46. The two first ones have the larger diameter end cavity connected to a pneumatic expansion chamber 10 and 11 that provides the elasticity to the pitch and rebound movements, while it behaves rigidly to roll. The other two have elastic elements 30–30' and 31 and 31' that allow the longitudinal flow, and therefore the pitch, without allowing neither the vertical rebound movement, nor the roll. Roll is therefore limited to the elasticity provided by the individual expansion chambers in each wheel 1, 2, 3 and 4.

Each hydropneumatic cavity 1, 2, 3, 4, 10 and 11, as well as the conduits that connect the devices 45 and 46 are also provided with a flow restriction valve designed to damp the oscillations of the flow in the circuit, and so absorb some of the energy given and taken to the compressed gas inside, damping in this way the oscillations of the vehicle body.

Figure 20:
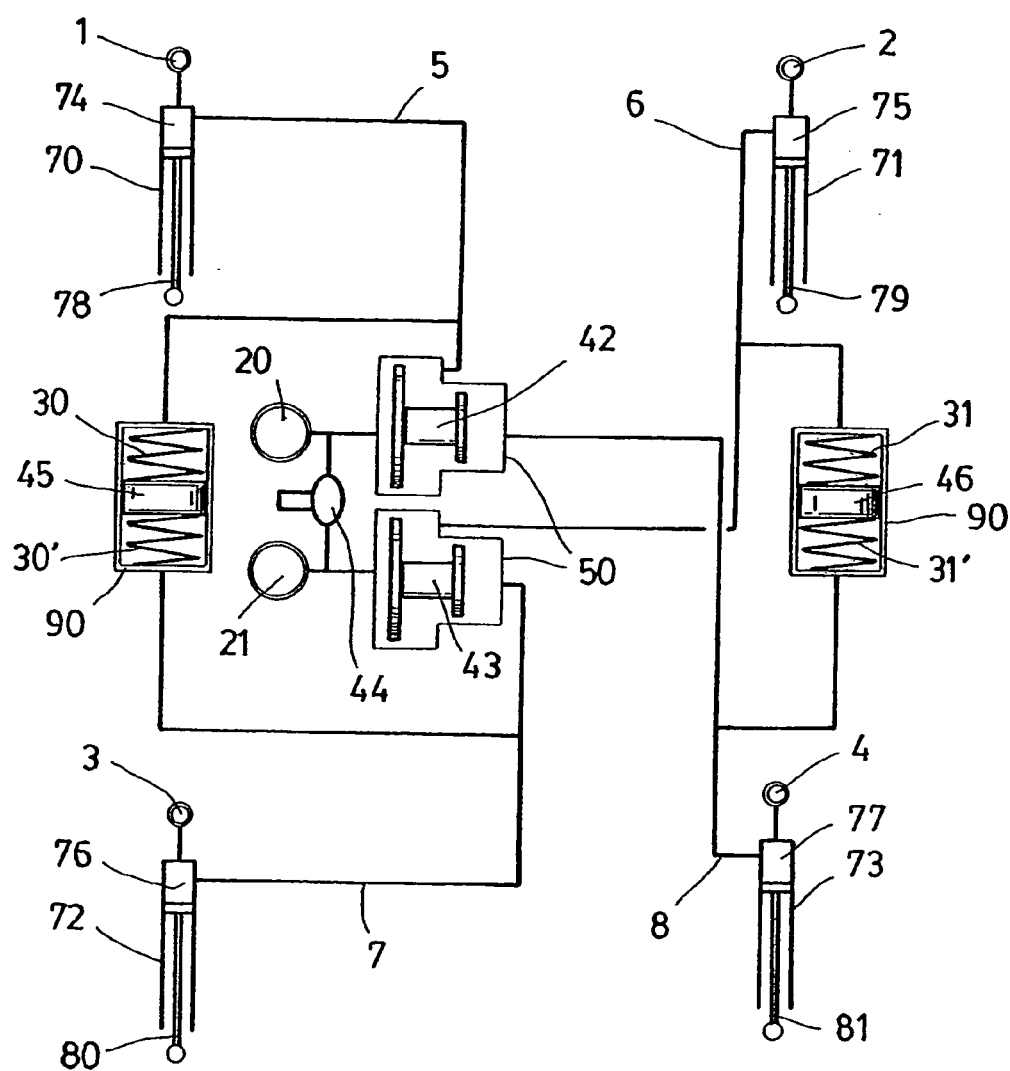
FIG. 20, is a schematic representation of the central device CD where it combines the two elements shown in FIGS. 11 and 14.

FIG. 20 shows a hydraulic suspension device where it over imposes the elements of central device CDs described in FIGS. 11 and 14.

This device is made by four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, two double piston devices 42 and 43 such as the one described in FIG. 9 diagonally connected to each cylinders through conduits 5 and 8, and the other to conduits 6 and 7 that are connected to the intermediate and smaller diameter end cavities of the double piston devices, and two simple piston devices 45 and 46 such as the one described in FIG. 4 that is connected between the wheels of the same side of the vehicle through conduits 5 and 7 in one side, and 6 and 8 in the other side.

Each cylinder arranged between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made up by the two double piston devices 42 and 43 and the two simple piston devices 45 and 46. The two first ones have the larger diameter end cavity connected to a pneumatic expansion chamber 20 and 21 that provides the elasticity only to rebound movements, while it behaves rigidly to roll and pitch. The other two have elastic elements 30–30' and 31 and 31' that allow the longitudinal flow, and therefore the pitch, without allowing neither the vertical rebound movement, nor the roll. Roll is therefore limited to the elasticity provided by the individual expansion chambers in each wheel 1, 2, 3 and 4.

Each hydropneumatic cavity 1, 2, 3, 4, 10 and 11, as well as the conduits that connect the devices 45 and 46 are also provided with a flow restriction valve designed to damp the oscillations of the flow in the circuit, and so absorb some of the energy given and taken to the compressed gas inside, damping in this way the oscillations of the vehicle body.

Figure 21:
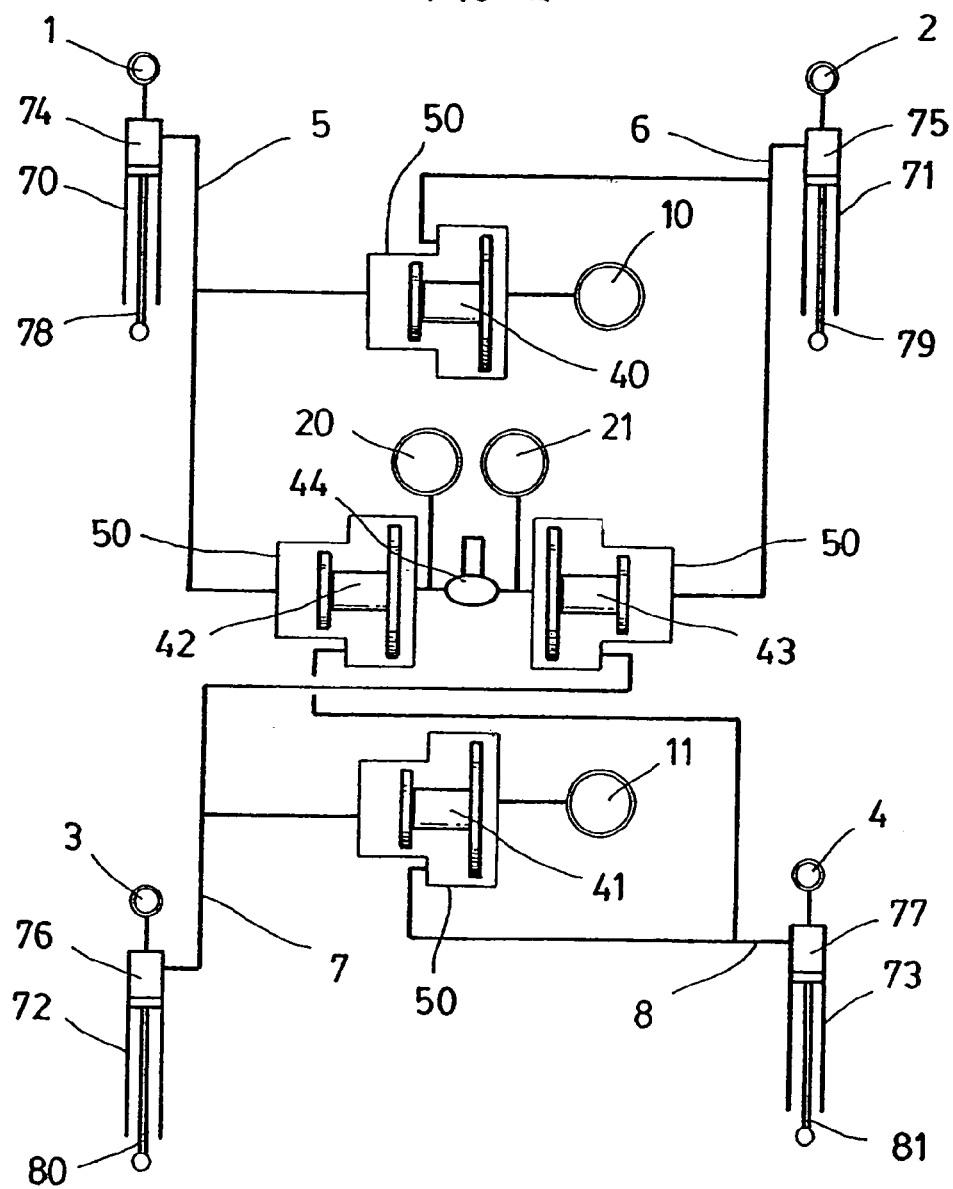
FIG. 21, is a schematic representation of the central device CD where it combines the two elements shown in FIGS. 10 and 11.

FIG. 21 shows a hydraulic suspension device where it over imposes the elements of central devices described in FIGS. 10 and 11.

This device is made by four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body and four double piston devices 40, 41, 42 and 43 such as the one described in FIG. 9 being 42 and 43 diagonally connected to each cylinders through conduits 5 and 8, and the other to conduits 6 and 7 that are connected to the intermediate and smaller diameter end cavities of these two double piston devices, and the other two double piston devices 40 and 41 transversely between wheels of the same side of the vehicle to conduits 5 and 7 in one side, and 6 and 8 in the other.

Each cylinder arranged between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made of the four double piston devices 40, 41, 42 and 43. All of them have the larger diameter end cavity connected to a pneumatic expansion chamber 10, 11, 20 and 21 that provides the elasticity to a particular movement. Expansion chambers 10 and 11 provide the elasticity to pitch and rebound, while the chambers 20 and 21 only to the rebound movement. The set behaves rigidly to roll, which is therefore limited to the elasticity provided by the individual expansion chambers in each wheel 1, 2, 3 and 4.

The larger diameter end cavities are also connected between them through a valve 44 that can be opened or closed at will to provide isostaticity to the system. When the valve is closed, the adaptation to irregular terrains creates an irregular weight distribution, more with the rigidity of the hydropneumatic chambers 20 and 21. When the valve is open, the system is isostatic because it allows the antiparallel movement of the two diagonal wheels sets.

Each hydropneumatic cavity 1, 2, 3, 4, 10, 11, 20 and 21, as well as the conduits that connect the devices 43 and 44 are also provided with a flow restriction valve designed to damp the oscillations of the flow in the circuit, and so absorb some of the energy given and taken to the compressed gas inside, damping in this way the oscillations of the vehicle body.

Figure 21A:
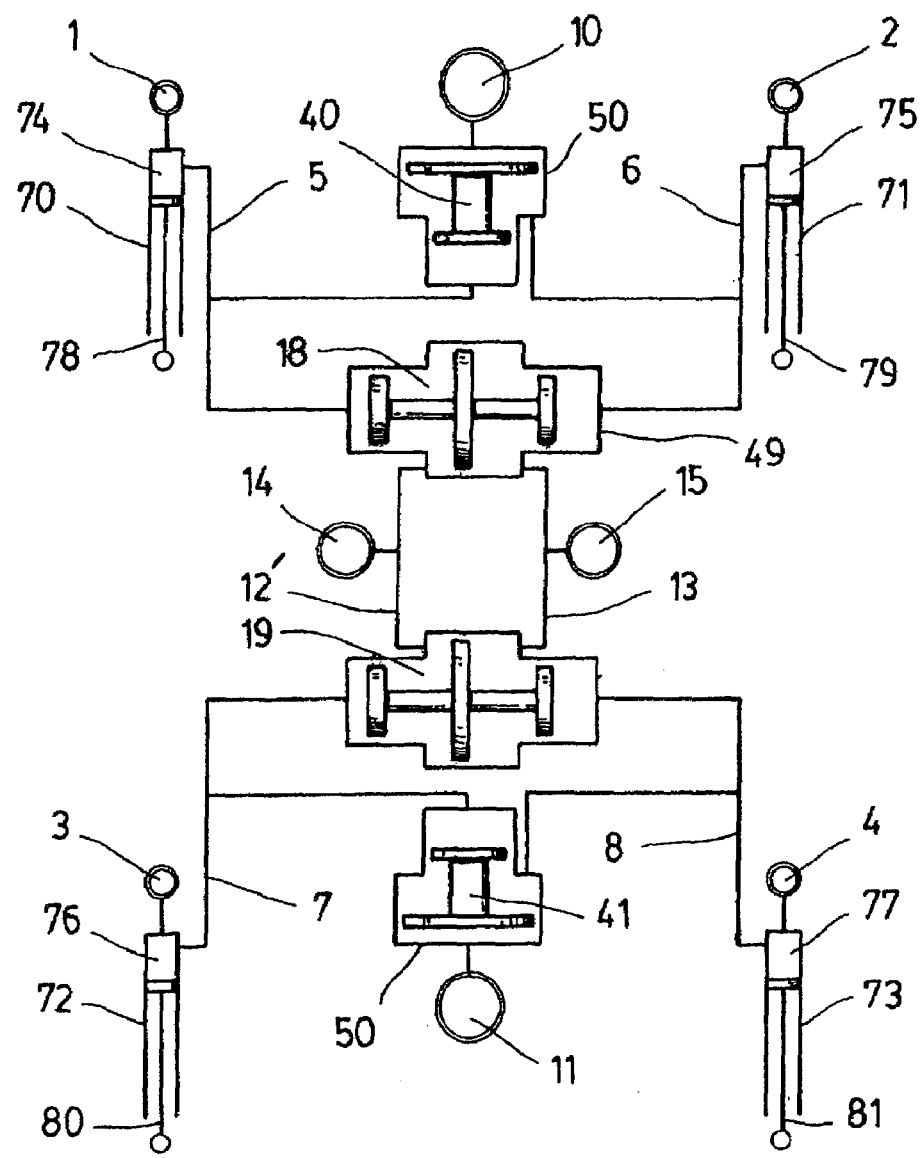
FIG. 21A, is a schematic representation of the central device CD where it combines the two elements shown in FIG. 10 and two devices as shown in FIG. 13.

FIG. 21A shows a hydraulic suspension device where it connects two central device CDs described in FIG. 13, and it over imposes the elements of the central device CD shown in FIG. 10.

This device is made by four simple effect hydraulic cylinders 70, 71, 72 and 73 connected between the chassis and the wheels where the piston 78, 79, 80 and 81 define an upper cavity 74, 75, 76 and 77 such that its volume varies proportionally to the movements of each wheel in respect to the vehicle body, two double piston devices 40 and 41 such as the one described in FIG. 9 being transversely connected, the 40 to front wheel cylinders, and the 41 to the rear wheel cylinders, and two triple piston devices 18 and 19 transversely arranged and connected to each other, so the end cavities of such devices are connected to each of the wheel cylinders, and the central cavities are connected to each other and to the hydropneumatic devices 14 and 15 through conduits 12' and 13.

Each cylinder arranged between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel.

In this figure, the central device CD is made up by the four devices, the two double piston devices 40 and 41, and the two triple piston devices 18 and 19. The two firs ones 40 and 41 have the larger diameter end cavity connected to the pneumatic expansion chamber 10 and 11 that provides the elasticity to the vertical rebound and pitch movements. The second ones 18 and 19 are connected to each other through the longitudinal conduits 12' and 13 that provide the capability of axle crossing, while the cavities 14 and 15 only provide the elasticity to roll movement, elasticity that is added to the elasticity of the expansion chambers of each wheel.

The connection through conduits 12' and 13 is the one responsable of axle crossing. To restrict such movement, it is possible to insert valves that can be opened or closed at will to modify the characteristics of the system. When such conduits allow the flow of the fluid, the system is isostatic because it allows the antiparallel movement of the two diagonal sets of wheels.

Each hydropneumatic cavity 1, 2, 3, 4, 10, 11, 14 and 15 are also provided with a flow restriction valve designed to damp the oscillations of the flow in the circuit, and so absorb some of the energy given and taken to the compressed gas inside, damping in this way the oscillations of the vehicle body.

Figure 22:
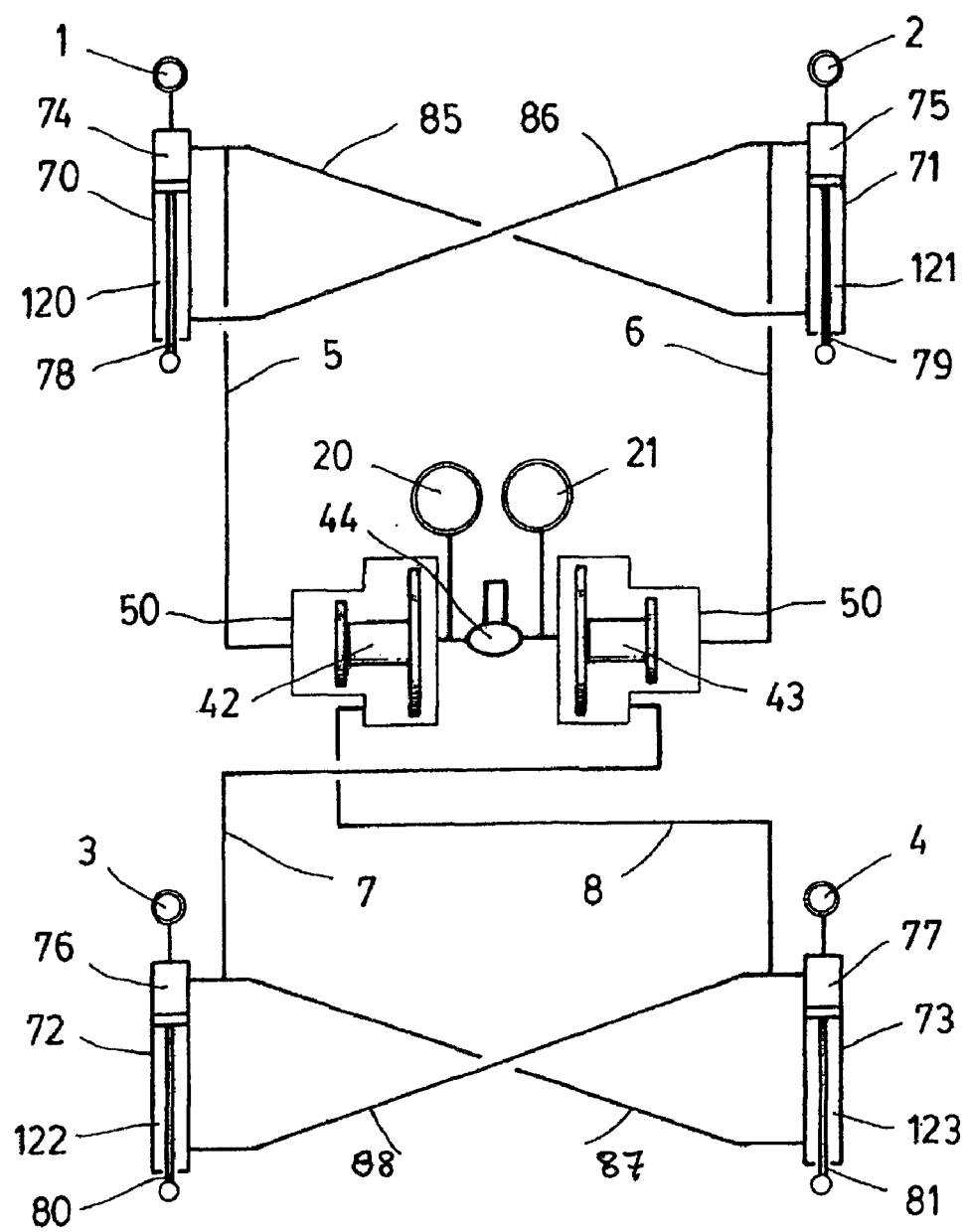
FIG. 22, is a schematic representation of the central device CD equivalent to the one in FIG. 21 where two of the double piston elements have been taken out, and the wheel cylinders are double effect rams.

FIG. 22 shows a hydraulic suspension that is equivalent to the device in FIG. 21 where the simple effect cylinders mounted between the vehicle body and the wheels are substituted by double effect cylinders that allow suppressing the transverse connection elements 40 and 41.

This device is made by four double effect hydraulic cylinders 70, 71, 72 and 73 connected between the chassis and the wheels where the piston 78, 79, 80 and 81 define an upper cavity 74, 75, 76 and 77 and a lower cavity 120, 121, 122 and 123 such that its volume varies proportionally to the movements of each wheel in respect to the vehicle body, the upper ones in one direction, and the lower ones in the opposite direction, and a central device CD as the one shown in FIG. 11.

The cylinders mounted on transversely opposed wheels are connected to each other in such a way that the upper cavities of the left 74 and 76 are connected to the lower cavity of their opposed 121 and 123 through hydraulic conduits 85 and 87, and vice versa the cavities 75 and 77 with the 120 and 122 through conduits 86 and 88.

Each cylinder arranged between the vehicle body and the wheels has a hydropneumatic cavity 1, 2, 3 and 4 that is connected to the cylinder cavity 74, 75, 76 and 77 or to the conduit 5, 6, 7 and 8 that connects it to the central device CD. This hydropneumatic cavity provides the elastic component associated to each wheel. It is foreseen that expansion chambers are connected to the lower cylinder cavities in such a way that it would damp the possible battering shock on the transverse conduits 85, 86, 87 and 88.

In this figure, the central device CD is made of the two devices, the two double piston devices 42 and 43. Both have the larger diameter end cavity connected to the pneumatic expansion chamber 20 and 21 that provides the elasticity only to the vertical rebound movement. This central device CD behaves rigidly to roll, which is then limited to the elasticity that is provided by the individual expansion chambers associated to each wheel 1, 2, 3 and 4 given the areas relationship in the pistons 70, 71, 72 and 73 where the effective area of the lower cavities 120, 121, 122 and 123 is reduced because of the piston rod 78, 79, 80 and 81.

The larger diameter end cavities of double pistons 42 and 43 are also connected between them through a valve 44 that can be opened or closed at will to provide isostaticity to the system. When the valve is closed, the adaptation to irregular terrains creates an irregular weight distribution, more with the rigidity of the hydropneumatic chambers 20 and 21.

When the valve 44 is open, the system is isostatic because it allows the antiparallel movement of the two diagonal wheels sets.

When the valve 44 is closed, the adaptation to irregular terrains provides an irregular weight distribution, so more irregular the more rigid expansion chambers 20 and 21 are. When the valve 44 is open, the system is isostatic because it allows the antiparallel movement of the two diagonal wheels sets.

Each hydropneumatic cavity 1, 2, 3, 4, 20 and 21 is also provided with a flow restriction valve designed to damp the oscillations of the flow in the circuit, and so absorb some of the energy given and taken to the compressed gas inside, damping in this way the oscillations of the vehicle body.

Figure 23:
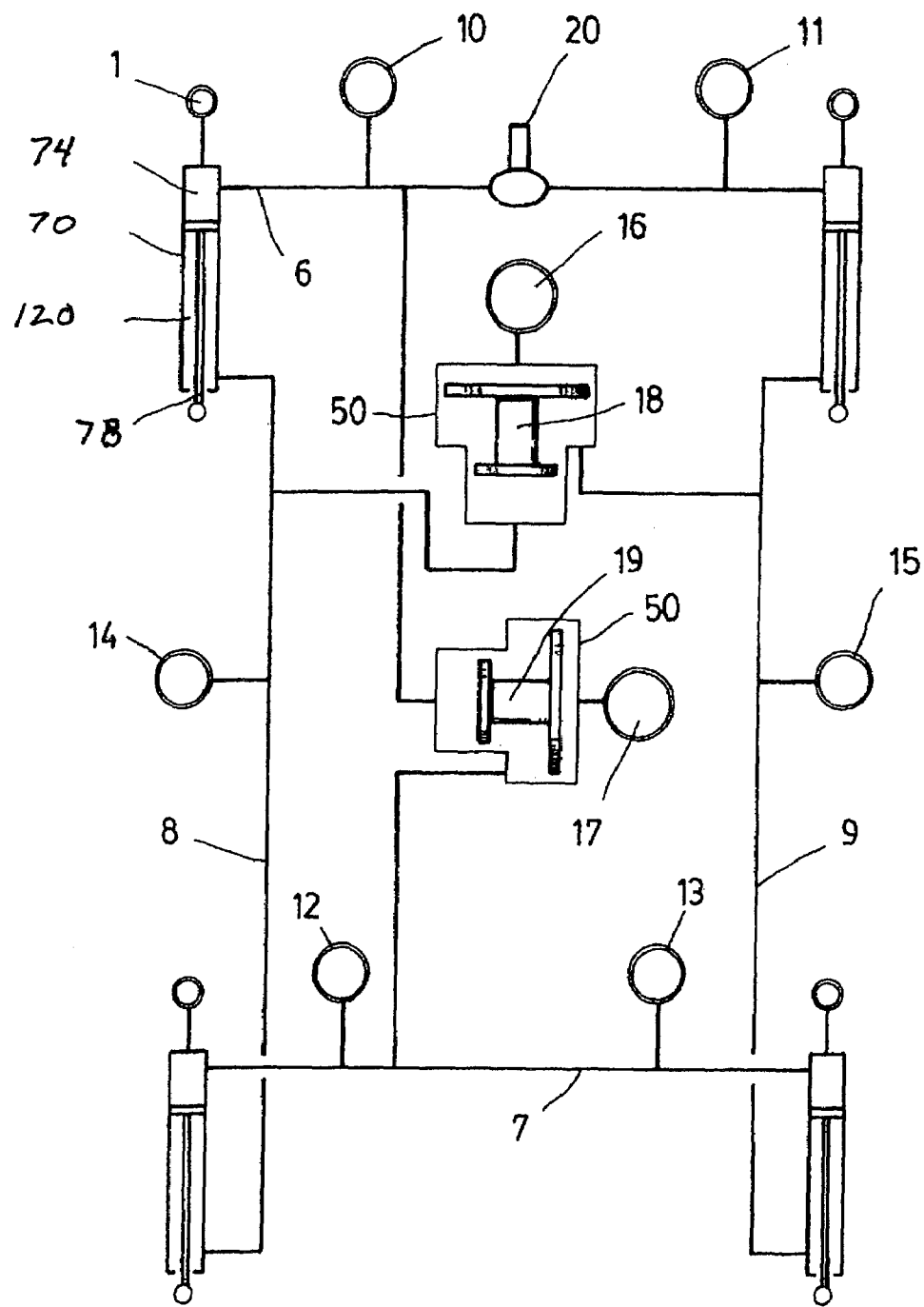
FIG. 23 is a schematic representation of the central device CD applied to a system where each vehicle wheel is connected to a double effect ram, all connected to each other in such a way that the upper cavities of each cylinder are connected to the transversely opposed cylinder, and the lower ones to the longitudinally opposed cylinder, having each conduit one or more hydropneumatic spheres connected, and having a central device CD made of two devices as the one described in FIG. 1, each of them connected either to the transverse or longitudinal conduits.

FIG. 23 is a hydraulic suspension system where the cylinders mounted between the vehicle body and the wheels are double effect hydraulic rams longitudinally and transversely connected to each other in such a way that the upper cavities 74 of each cylinder 70 are connected transversely through conduits 6 and 7, and the lower cavities 120 are longitudinally connected through conduits 8 and 9. Both transverse and longitudinal conduits have hydropneumatic spheres connected near the cylinders to provide elasticity to roll when connected on the longitudinal conduits, and to pitch when connected to transverse conduits. The vertical movement creates a variation of the volume of all spheres so the stiffness of such movement is the addition of stiffness of pitch and roll.

To obtain a softer vertical movement stiffness it is added the devices 18 and 19, the first one connected to the longitudinal conduits 8 and 9, and the second one to the transverse conduits 6 and 7. The expansion cavities 16 and 17 provide in this way an additional elasticity that only modifies the vertical movement and not to the pitch and roll movements. In this way it is possible to soften the suspension for vertical movement without having to increase cavities 10, 11, 12 and 13 directly connected on the transverse conduits 6 and 7 and longitudinal 8 and 9.

To prevent the axle crossing we can arrange in any of the conduits 6, 7, 8 and 9, preferably in the transverse 6 and 7 a valve 20 which mission is to make the system isostatic when opened, and hiperstaticity when closed.

Figure 24:
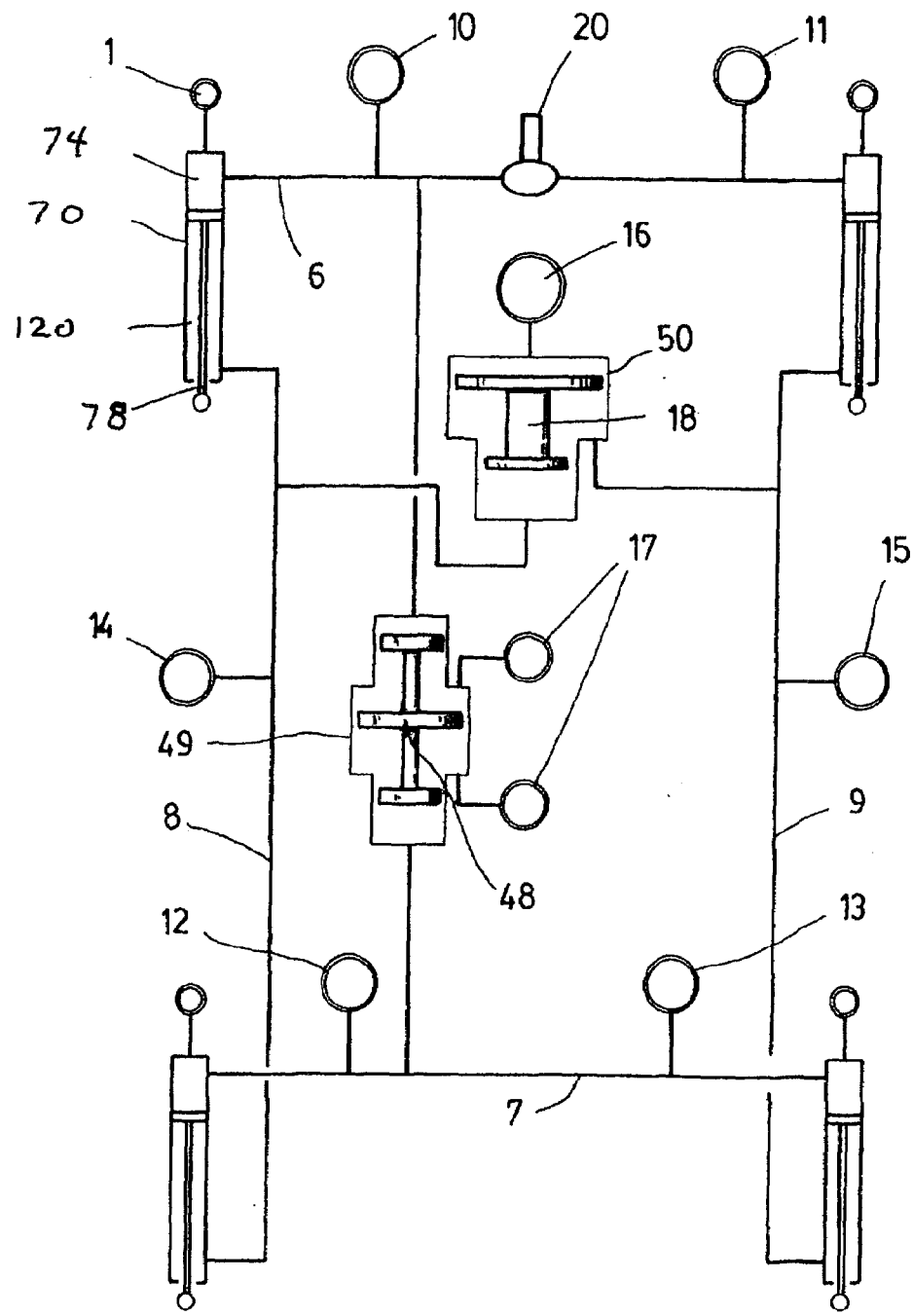
FIG. 24, is a schematic representation of the central device CD applied to a system such as in the FIG. 23 where the device that connects the transverse conduits is substituted by a device such as the one described in FIG. 12 or 13, so it provides an effect favorable to the vehicle pitch.

FIG. 24 is a schematic representation of the hydraulic suspension system as in FIG. 23 where the device connected to transverse conduits 6 and 7 is made of a triple piston device such as in the FIG. 13 where the end cavities are connected to transverse conduits, so the expansion chambers 17 only provide elasticity to pitch, and not to vertical movement.

Figures 25, 26:
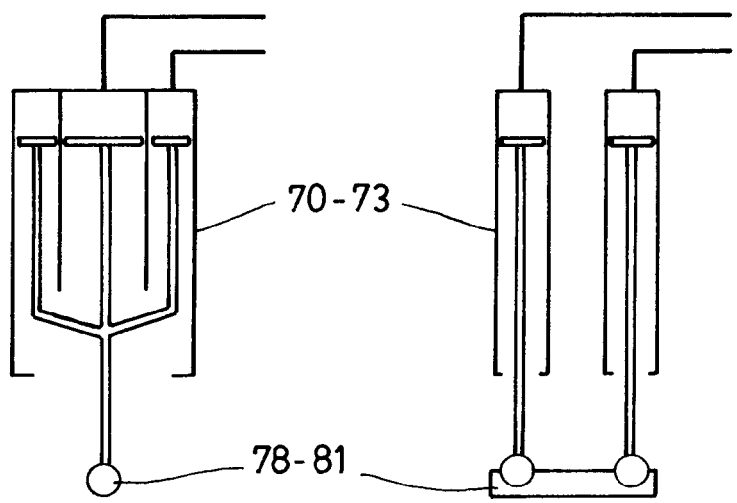
FIGS. 25 and 26 are two schematic representations of two alternative implementations to the use of double cylinders, where they are substituted either by a double concentric cylinder, or two separated cylinders.

FIGS. 25 and 26 are two schematic representations of alternative implementations of the double effect cylinders 70–73 where they are substituted by either two concentric cylinders or two separated cylinders. In both cases, each double effect cylinder chamber has its correspondence with the chambers that each of they substituting cylinders, being the first figure for the case of two concentric cylinders that are equivalent to two cylinders working in parallel.

These alternatives provide two cavities for each wheel, one for the transverse connection, and another for the longitudinal one. The advantage of these systems is that both chambers vary their volume in the same way. This characteristic makes the system feel over pressure in the more loaded cylinders, so the progressivity of the hydropneumatic elements grow the elastic characteristic when the vehicle body gets closer to the terrain, a situation that would be inverse in the case of lower cavities when using double effect cylinders.

Figure 27:
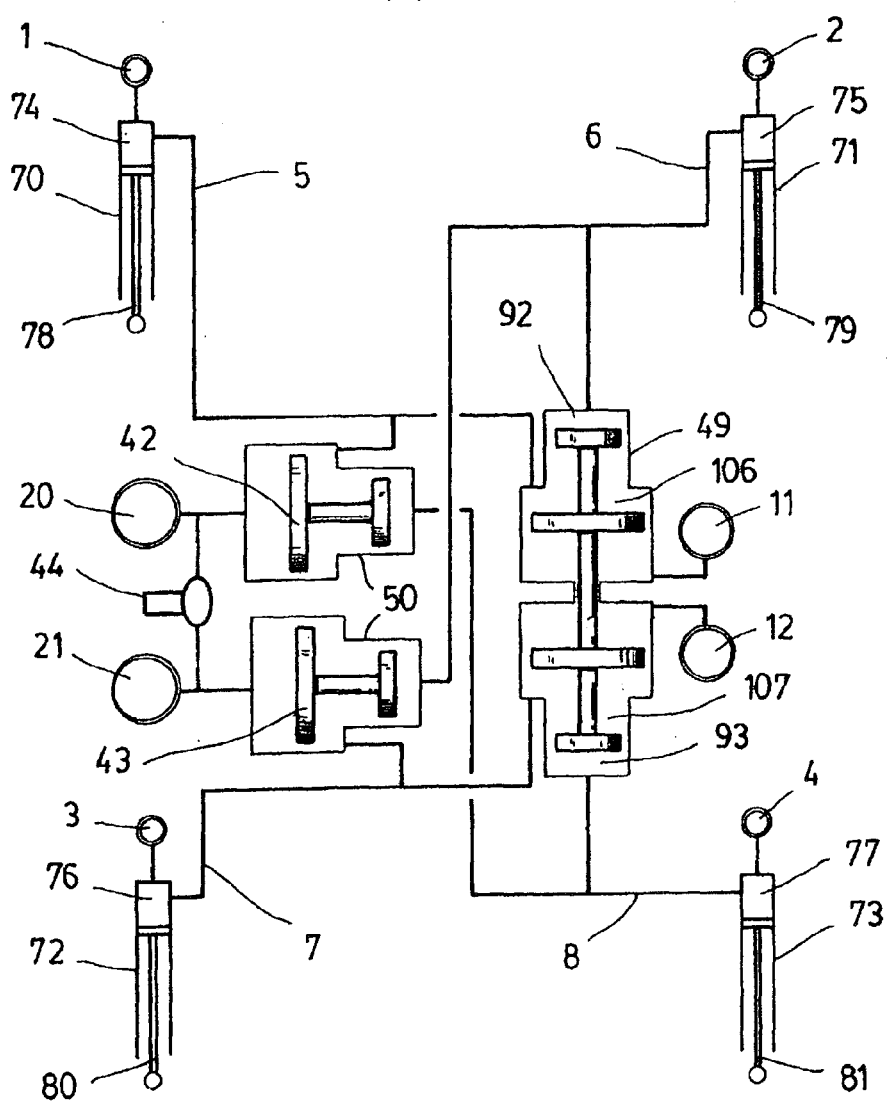
FIG. 27, is a schematic representation of an implementation similar to the FIG. 18 where the double and triple cylinders are respectively joined in a single device with four linked pistons.

FIG. 27 is a schematic representation of an implementation similar to FIG. 18 where the double and triple piston 41 and 48 are respectively linked in a single four piston device 49. Such device is just the linkage of the double piston devices such as in the FIG. 1, through the larger diameter end, where an opening gives way to the rod that links the two double pistons. This rod passes through an opening without communicating the two cavities separated by the wall where the passage is made, so the two cavities remain independent and connected to each expansion cavities like in FIG. 18.

This device shows a four piston device 49 which movement provides only the vehicle pitch thanks to the hydropneumatic elements 11 and 12, and therefore allows the design of a resistance to pitch with independence of the resistance to vertical movement that is controlled by the hydropneumatic elements 20 and 21 such as it happens in FIG. 18.

Figure 28:
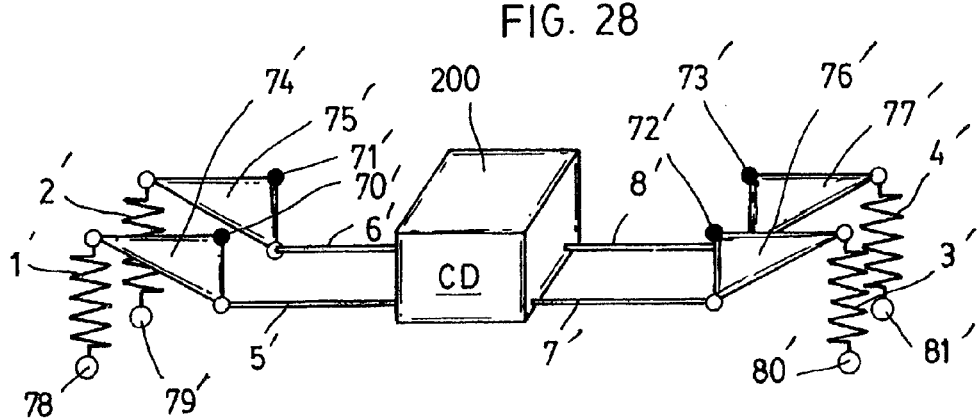
FIG. 28, is a schematic representation to show the arrangement of the central device CD with mechanical means where each wheel is connected to an angled lever that rotates on the vehicle chassis through a elastic element, and this angled lever converts the movement into horizontal to be transmitted to the central device CD through a rigid connecting link.

FIG. 28 is a schematic representation of a mechanical suspension device where each wheel support 78', 79', 80' and 81' is connected to the central device CD 200 through an elastic element 1', 2', 3' and 4', and of an equivalent function to the hydropneumatic cavities, and a set of angled levers 74', 75', 76' and 77', and connecting links 5', 6', 7' and 8' between the levers and the central device CD, connecting links that are of a equivalent functionality to the hydraulic conduits of same reference.

In this scheme, we consider that each wheel movement, principally in the vertical direction, is transformed into horizontal, and sent to the central device CD 200 through mechanical means provided with certain elasticity degree. In this figure, the elastic element 1', 2', 3' and 4' is interposed between the wheel support and the angled lever that rotates on the vehicle body on an axis 70', 71', 72' and 73'. In this way, the elastic element absorbs some of the wheel oscillations before transmitting such movement to the mechanical means that connect it with the central device CD. The angled lever 74', 75', 76' and 77' is in charge of transforming such vertical movement into horizontal through the arms respectively connected to elastic elements 1', 2', 3' and 4' with the connecting links 5', 6', 7' and 8'

It is understood that the elastic element 1', 2', 3' and 4' between the wheel movement 78', 79', 80' and 81' and the central device CD 200 can be integrated either in the angled lever itself 74', 75', 76' and 77' that converts the vertical movement into horizontal, or in the connecting links 5', 6', 7' and 8' that transmit the movement to the central device CD.

Figure 29:
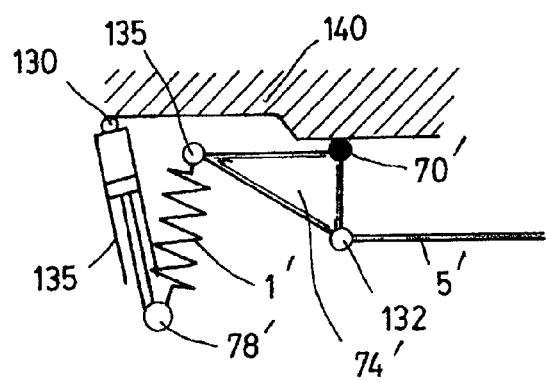
FIGS. 29 and 30 are a schematic representation of the mechanical transmission means shown in the previous figure where it shows two possible configurations in the damping elements mounting.
Figure 30:
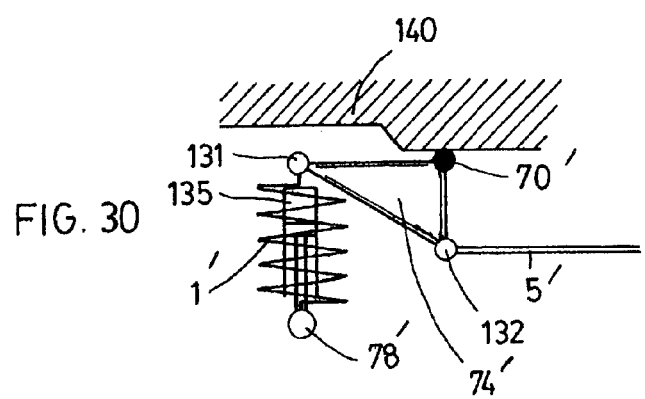

FIGS. 29 and 30 are a schematic representation of two possibilities in a transmission device for the vertical movements to the central device CD where the wheel support 78' is connected to the elastic element 1', and a hydraulic shock absorber 135. The hydraulic shock absorber 135 is the same as the hydraulic cylinders 70, 71, 72, 83 in FIG. 15, being this scheme referred to the mounting of the damping element.

In the case shown in FIG. 29, this is mounted in a conventional manner between the wheel support 78' and a support 130 fixed to the vehicle body or chassis 140. The elastic element is still following the scheme of previous figure, being part of the kinematic chain mounted between the wheel support 78' and the central device CD connected through the connecting link 5'. It is important to note here that connecting link 5' must then be resistant both to traction as well as to compression, because the hydraulic shock absorber opposes to vertical movements in both directions. This may have constructive consequences for the angled lever 74'.

In the case shown in FIG. 30, this is mounted between the wheel support 78' and the end 131 of the angled lever 74', in parallel with the elastic element 1'. One possible constructive solution might be to place the shock absorber inside a coil spring, although it is possible to foresee other solutions and other schemes, especially when such elastic element is integrated in the angled lever 74', or inserted in the connecting link 5'.

Figure 31:
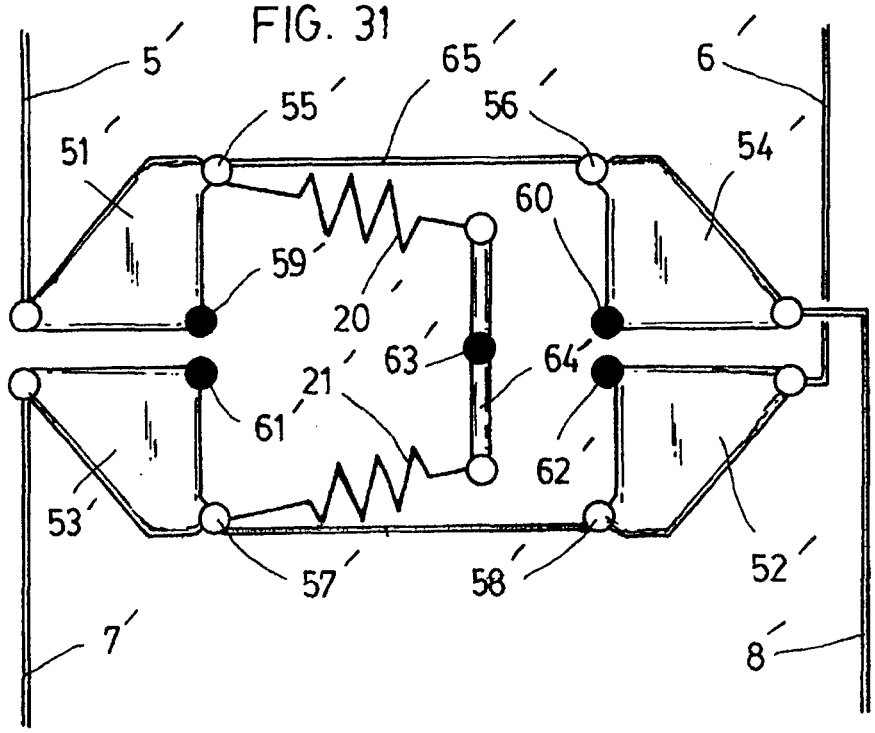
FIG. 31 is a schematic representation of the central device CD following a mechanical implementation of the invention according to an isostatic system type X

FIG. 31 is a schematic representation of one possible constructive solution of the central device CD in a mechanical suspension system that follows the general scheme described in FIGS. 28, 29 and 30 that kinematically link the diagonally opposed wheel vertical movements.

In this central device CD, the four connecting links 5', 6', 7' and 8' are connected to one of the arms of the angled levers 51', 52', 53' and 54' that rotate on an axis 59', 60', 61' and 62' fixed to the vehicle body as it is shown in this figure.

The angled levers 51' and 54' are connected to each other through the articulated rod 65'. This rod, mounted on the articulations 55' and 56' forces that the movement experienced by connecting links 5' and 8' connected to the other arm of arms 51' and 54' be always in the same direction of moving closer or further in respect to the central device CD, and therefore the respective diagonally opposed wheels vertical movement be in the same direction.

Angled levers 52' and 53' create the same kinematic relationship between connecting links 6' and 7', and in a similar way force that the also diagonally opposed wheels vertical movement is in the same direction.

It is to be noted that axis 59' and 61' where the angled levers 51' and 53' rotate can coincide if the set of kinematic elements that link diagonally opposed wheels are arranged in two over imposed planes. In this case, axis 60' and 62' should coincide too.

Springs 20' and 21' create a force on the transmission means between diagonally opposed wheels that transmit to the wheels and keep the vehicle height. Such springs are connected to a balance beam 64' that rotates on a vertical axis 63' fixed to the vehicle body. When this balance beam oscillates, it allows the opposed movement of wheels are in a diagonal in respect to the wheels that are in the other diagonal, thus allowing that the two sets of wheels can separate from a common plane, and the suspension can adapt in an isostatic way to the terrain irregularities.

Springs 20' and 21' could also be connected directly to the vehicle chassis without the balance beam 64'. This would configure the system as hyperstatic, because the weight distribution on the wheels would not remain uniform when the supporting surface was not completely plane. It is also possible to provide the balance beam 64' with a blocking mechanism or with an elastic element that connects it to the vehicle body in such a way that it only allows its controlled or limited movement.

It can be observed how this device behaves in an elastic way in front to vertical rebound, while it is rigid to roll and pitch. The axle crossing related with the rotation of balance beam 64' is therefore free.

Figure 32:
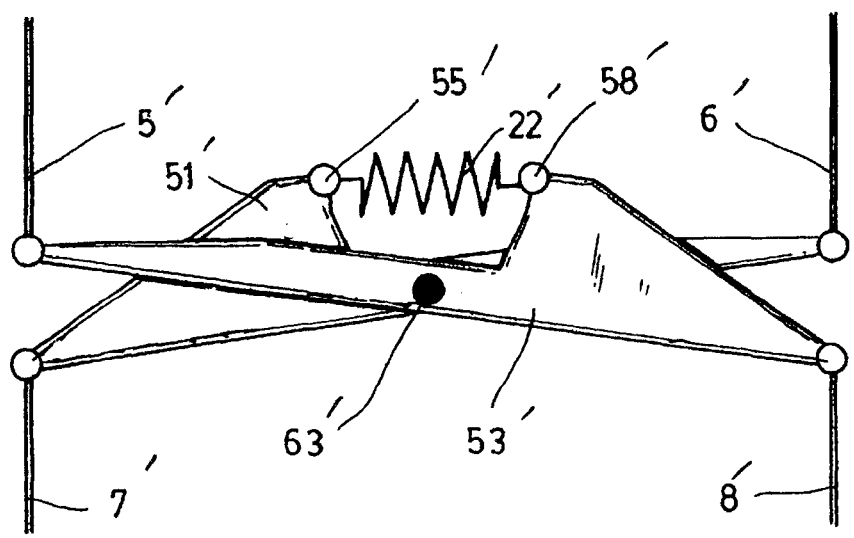
FIG. 32 is a schematic representation of the central device CD following another mechanical solution that is equivalent to the one in FIG. 31.

FIG. 32 is a schematic representation of a possible implementation of the central device CD in a mechanical suspension system following the general scheme shown in FIGS. 28, 29 and 30 where it kinematically links the diagonally opposed wheels vertical movements.

In this central device CD, the four connecting links 5', 6', 7' and 8' are connected to the ends of two balance beams 51' and 53' that rotate on a common vertical axis 63' fixed to the vehicle body as it is shown in the figure.

The farthest ends of balance beam 53' are connected to connecting links 5' and 8' from the wheels in one of the diagonals, while the balance beam 51' is connected to connecting links 6' and 7' of the other diagonal. This layout forces that the movements that connecting links 5' and 8' which are connected to the ends of balance beam 53' experiment a movement always in the same direction of getting closer or farther in respect to the central device CD, and therefore, the respective diagonally opposed wheels vertical movements be the same in the vertical direction. Balance beam 51' creates the same kinematic relationship between connecting links 6' and 7' in a similar way forcing that the also diagonally opposed respective wheels vertical movements be the same in the same direction.

In this arrangement, the spring 22' connected to the articulations 55' and 58' of balance beams 51' and 53' exerts a force between them in the inverse rotating sense, in a way that it is transmitted to the transmission means between diagonally opposed wheels, and from these to the wheels in the two diagonal sets in order to exert a vertical force and maintain the vehicle weight. Such spring can move without being compressed, in so making that the two balance beams rotate together over the axis 63', allowing thus the opposed movement of wheel that are found in a diagonal in respect to the others in the other diagonal, separating both sets of wheels from a common plane, so the suspension adapts in an isostatic way to the terrain irregularities.

Spring 22' can be substituted or complemented by two springs connected between the chassis and the articulations 55' and 58', determining then the system as hyperstatic because the weight distribution between the wheels would no longer be uniform when the supporting surface is no longer completely plane. It is also possible to provide the articulations 55' and 58' with an elastic stop that relates them with the vehicle body in a way that it allows a controlled or limited movement of spring 22'.

It is to be observed how this device behaves in an elastic way towards the vertical rebound movement, being rigid to roll and pitch. The axle crossing related to the rotation of both balance beams 51' and 53' together and the lateral movement of elastic element 22' is therefore free.

Figure 33:
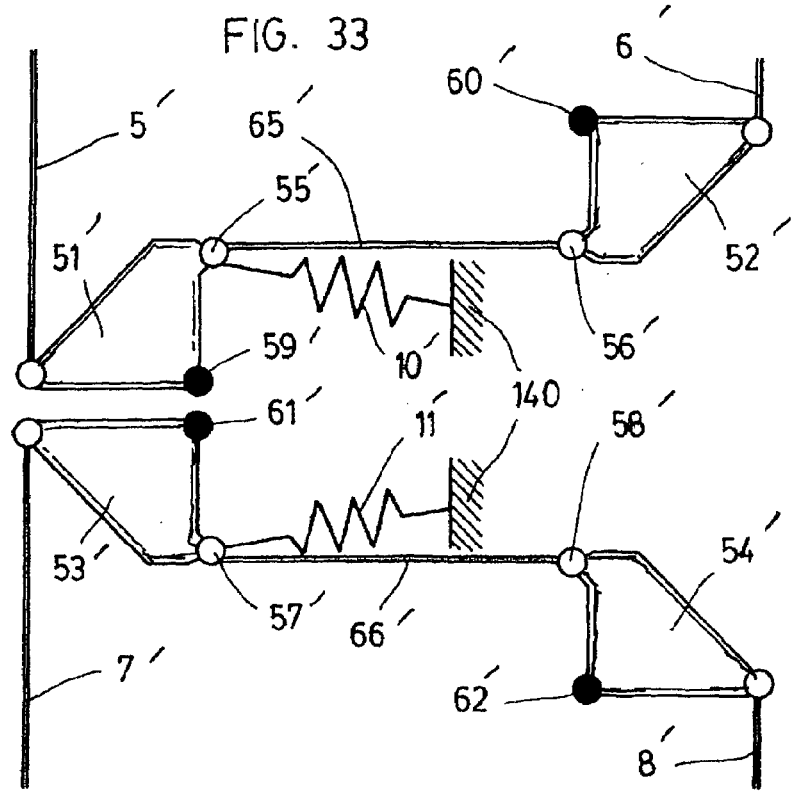
FIG. 33 is a schematic representation of the central device CD following a non-isostatic system type T where the connecting links of the transmission means are connected to angled levers that convert the longitudinal movements into transversal.

FIG. 33 is a schematic representation of a possible implementation of the central device CD in a mechanical suspension system following the general scheme shown in FIGS. 28, 29 and 30 that kinematically links the transversely opposed wheel vertical movements.

In this central device CD the four connecting links 5', 6', 7' and 8' are connected to one of the angled lever 51', 52', 53' and 54' arms that rotate on axis that are fixed to the vehicle body 59', 60', 61' and 62' as shown in the figure.

Angled levers 51' and 52' are connected to each other through the articulated rod 65'. This rod, mounted on the articulations 55' and 56' forces that the movement of connecting links 5' and 6' connected to the other arm of levers 51' and 52' be always in the same direction of getting closer or farther in respect to the central device CD, and that the transversely opposed wheels vertical movements be in the same sense.

Levers 53' and 54', and the rod 66' create the same kinematic relationship between connecting links 7' and 8', and in a similar way they force that the also transversally opposed wheel vertical movements be in the same direction.

It is to be noted that axis 59' and 61' where the angled levers 51' and 53' rotate can be made to coincide provided that the kinematic element sets that link diagonally opposed wheel are place in two parallel planes. In this case, axis 60' and 62' have also to be made coincident.

In this figure the spring 10', connected to articulations 55' or 56' exerts a force on the transmission means between transversely opposed wheels. The transversely opposed wheels together vertical movement creates a movement of the rods 65' and 66' that compresses or elongates the springs 10' and/or 11'. The reaction force of these elastic elements is transmitted to the wheels at one side and other side of the vehicle in a way that the elastic element 10' maintains the height of the front of the vehicle, and the elastic element 11' keeps the height of the rear of the vehicle.

It is to be observed that this device behaves in an elastic way to both the pitch and vertical rebound movements, being rigid to roll. The axle crossing is then restricted by the rigidity of elastic elements 10' and 11'.

Figure 34:
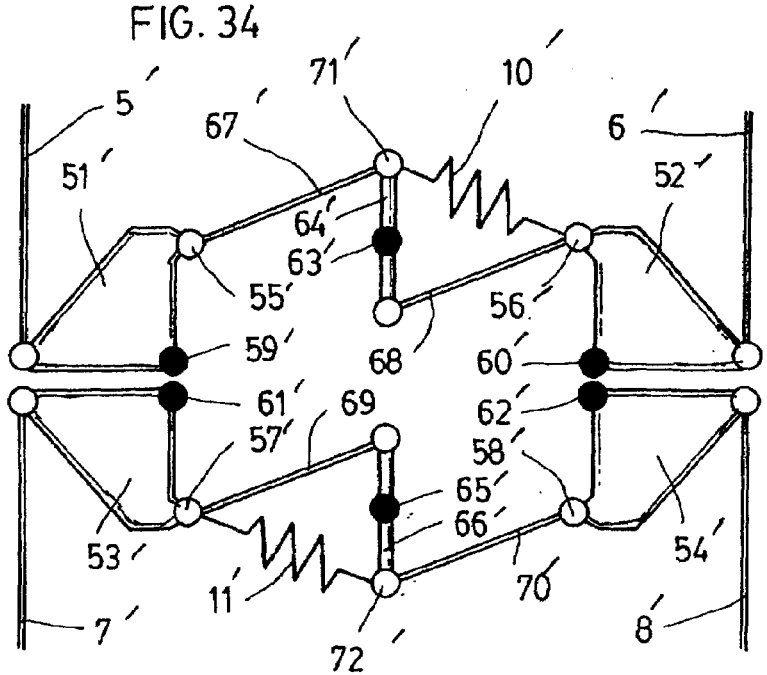
FIG. 34 is a schematic representation of the central device CD following a mechanical solution equivalent to the previous figure.

FIG. 34 is a schematic representation of a possible implementation of the central device CD in a mechanical suspension system following the general scheme shown in FIGS. 15 and 16 that kinematically links the transversely opposed wheel vertical movements.

In this central device CD, the four connecting links 5', 6', 7' and 8' are connected to one of the arms of the angled levers 51', 52', 53' and 54' that rotate on vertical axis fixed to the vehicle body 59', 60', 61' and 63' as shown in this figure.

Angled levers 51' and 52' are connected to each other through the articulated rods 67' and 68' that are connected to the balance beam 64' that rotates on the axis 63' fixed to the vehicle body. In a similar way, the angled levers 52' and 53' are connected to each other through articulated rods 69' and 70' that are connected with balance beam 66' that rotates on the axis 65' fixed to the vehicle body This arrangement forces that the movement of connecting links 5' and 6' connected to the angled levers 51' and 52' is always in the same direction of getting closer or farther in respect to the central device CD, and therefore, the respective transversely opposed wheel vertical movements be in the same direction. Angled levers 53' and 54' create the same kinematic relationship between connecting links 7' and 8' that in a similar way force that the respective transversely opposed wheels vertical movements be in the same sense.

It is to be noted that axis 59' and 61' where the angled levers 51' and 53' rotate can coincide if the sets of kinematic elements that link transversely opposed wheels are placed in two parallel planes. In such a case, axis 60' and 61' should also coincide.

Spring 10', connected to articulations 71' and 56' opposes to the simultaneous movement of angled levers 51' and 52' because the articulated rod 68' provides a kinematic relationship where the articulations 70' and 56' move in opposite directions when the balance beam 64' rotates. With this opposition, spring 10' opposes in short to the simultaneous and equal movement of connecting links 5' and 6' that can come closer or farther together in respect to the central device CD, and therefore to the vehicle front vertical movement.

Spring 11', connected to articulations 57' and 72' acts on the rear side of the vehicle following a similar function than of spring 10'.

Springs 10' and 11' can be also mounted between the chassis and any of the articulations where they are connected, and the functionality principle will be the same as they will oppose to the movement related of elements 51', 64' and 52' on one side, and 53', 66' and 54' on the other.

It is to be observed that this device behaves in an elastic way to either the pitch movement as well as the vertical rebound movement, being rigid to roll. The axle crossing is then restricted by the rigidity of elastic elements 10' and 11'.

Figure 35:
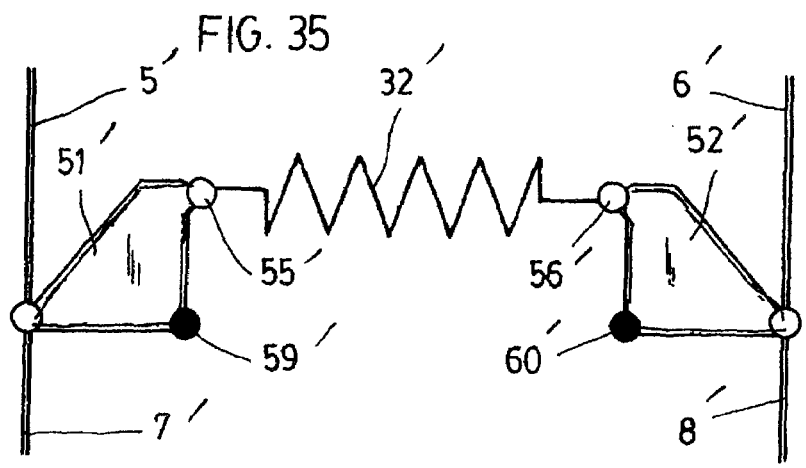
FIG. 35 is a schematic representation of the central device CD following a mechanical implementation of the system of type L-X where the connecting links of the transmission means are connected to two angled levers, one in each side, that are connected to a single elastic element.

FIG. 35 is a schematic representation of a possible constructive solution of the central device CD in a mechanical suspension system, following the general scheme shown in FIGS. 28', 29' and 30' that kinematically links the longitudinally opposed wheels vertical movements.

In this central device CD, the two connecting links 5' and 7' are connected to one of the arms of the angled lever 51, and the connecting links 6' and 8' to one of the arms of the angled lever 52'. Angled levers 51' and 52' rotate on vertical axis 59' and 60' that are fixed to the vehicle body as it is shown in the figure.

Angled levers 51' and 52' are connected to each other through the elastic element 32' that is mounted between the articulations 55' and 56' that are on the ends of such angled levers.

This arrangement forces that the movements of connecting links 5' and 7' connected to the angled lever 51' be always in the opposite direction of getting closer or farther in respect to the central device CD, and therefore, the longitudinally opposed respective wheels vertical movements be in the opposite direction. The angled lever 52' creates the same kinematic relationship between connecting links 6' and 8' in a similar way that forces that the also longitudinally opposed respective wheels vertical movements be in the opposite direction.

The elastic element 32' allows the free movement of articulations 55' and 56' as long as they are in the same direction, so it does not oppose to the rotation movement of angled levers 51' and 52' in the same direction, and therefore, to the movement in the same vertical sense of diagonally opposed wheels linked to connecting links 5' and 8', which is in the opposite direction to the wheels in the other diagonal that are linked to connecting links 6' and 7'.

Nevertheless, when the four connecting links 5', 6', 7' and 8' move all together in the same direction, movement that we relate to vehicle pitch, the elastic element 32' compresses or elongates, adding therefore its own elasticity to the one of the elastic elements found in the mechanical means, which the connecting links 5', 6', 7' and 8' are related with each vehicle wheel support vertical movement.

It is to be observed how this device behaves in an elastic way only to the pitch of the vehicle, being rigid to the roll and the vertical rebound movement. Axle crossing is related with the lateral displacement of the elastic element 32', so it is therefore free.

Figure 36:
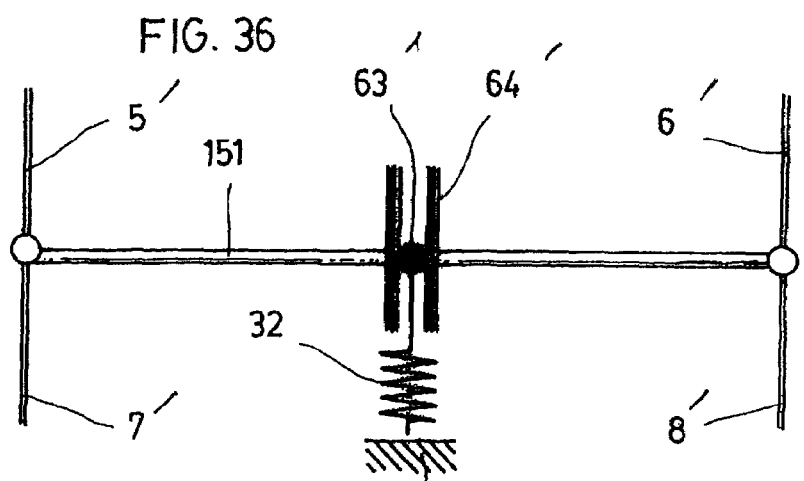
FIG. 36 is a schematic representation of the central device CD according to a mechanical system solution equivalent to the one in FIG. 33.

FIG. 36 is a schematic representation of a possible constructive solution of the central device CD in a mechanical suspension system according to the general scheme shown in FIGS. 22, 29 and 30 that kinematically links the vertical movements of longitudinally opposed wheels vertical movements and these among themselves.

In this central device CD, the two connecting links 5' and 7' are connected to one of the arms of balance beam 51', and the connecting links 6' and 8' to the other arm. The balance beam 151 rotates about a vertical axle 63' that has its own movements restricted within the guides 64' arranged longitudinally, and linked to the elastic element 32' mounted between the balance beam axis 63' and the vehicle body.

This arrangement forces that the movement of connecting links 5' and 57' that are connected to one end of the balance beam 151 be always in the contrary direction of getting closer or farther in respect to the central device CD, and therefore the longitudinally opposed respective wheels vertical movements be in the contrary direction. The same balance beam 151 creates the same kinematic relationship between the connecting links 6' and 8', and in a similar way force that the also longitudinally opposed respective wheels vertical movements are in the contrary direction.

The axis of balance beam 63' allows it to freely rotate, and therefore it will not oppose to the diagonally opposed wheels related to connecting links vertical movements in the same direction, and contrary to the other wheels in the other diagonal related to connecting links 6' and 7', vertical movements.

Nevertheless, when the four connecting links 5', 6', 7' and 8' move together in the same direction, move that is related with the vehicle pitch, the balance beam moves and the elastic element 32' is compressed or elongated, adding therefore its own elasticity to the elastic elements found in the mechanical means the connecting links 5', 6', 7' and 8' relate with the vertical movement of each vehicle wheel.

It is to be observed that this device behaves in an elastic way only to the vehicle pitch movement, becoming rigid to roll and vertical rebound movement. Axle crossing related with the rotation of balance beam 151 is therefore free.

Figure 37:
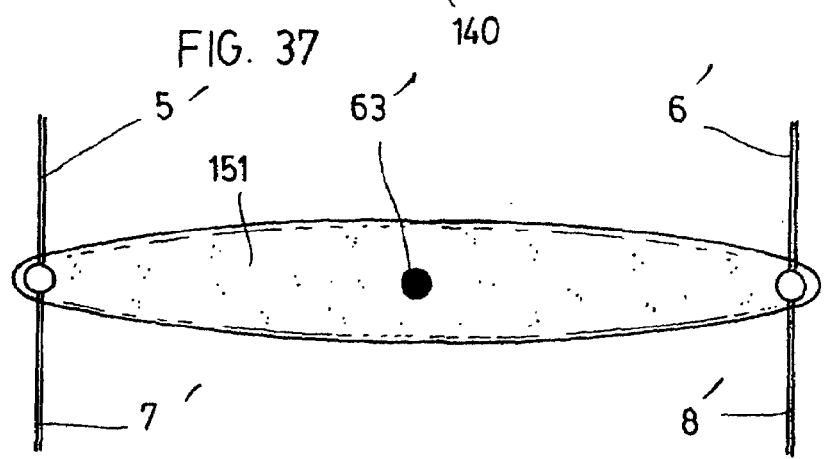
FIG. 37 is a schematic representation of the central device CD according to another mechanical system solution that is equivalent to the one in FIG. 33.

FIG. 37 is a schematic representation of a possible constructive solution of the central device CD in a mechanical suspension system, according to the general scheme shown in FIGS. 28, 29 and 36 that kinematically links the longitudinally opposed wheels vertical movements.

In this central device CD, the element that relates all movements is an elastic element 151, shaped as a balance arm that rotates around its center point. The two connecting links 5' and 7' are connected to one of the arms of the elastic balance beam 151, and the connecting links 6' and 8' to the other arm. The balance beam 51' rotates on a vertical axis 63' that is fixed to the vehicle body. The elasticity of that elastic element 151 allows that it bends, so the two ends can be on a straight line that is not going through the rotary axis 63', and therefore it behaves as the previous scheme 36'.

This arrangement forces that the movement of the connecting links 5' and 7' connected to one end of the balance beam 151 be always in the contrary direction of getting closer or farther in respect to the central device CD, and therefore the respective longitudinally opposed wheels vertical movements are in the opposed direction. The connection in the other end of elastic balance beam 151 creates the same kinematic relationship between connecting links 6' and 8', and in a similar way forces that the also respective longitudinally opposed wheels vertical movement be in the opposite direction.

The balance beam 63' axis allows it to freely rotate, and therefore it does not opposes the connecting links 5' and 8' related diagonally opposed wheels movement in the same vertical direction, and opposed to the other diagonal wheels related to connecting links 6' and 7'.

Nevertheless, when the four connecting links 5', 6', 7' and 8' move together in the same direction, movement that is related with the vehicle pitch, the balance beam bends thanks to its own elasticity, and its ends can move away from the line that at rest joins them with the rotation axis 63'. In this way it adds its own elasticity to the elastic elements found in the mechanical-means that relates the connecting links 5', 6', 7' and 8' with the vertical movement of every vehicle wheel mount.

It is to be observed that this device behaves in an elastic way only to the pitch movement, being rigid to roll and to vertical rebound. The axle crossing related with the balance beam 51' rotation is therefore free.

Figure 38:
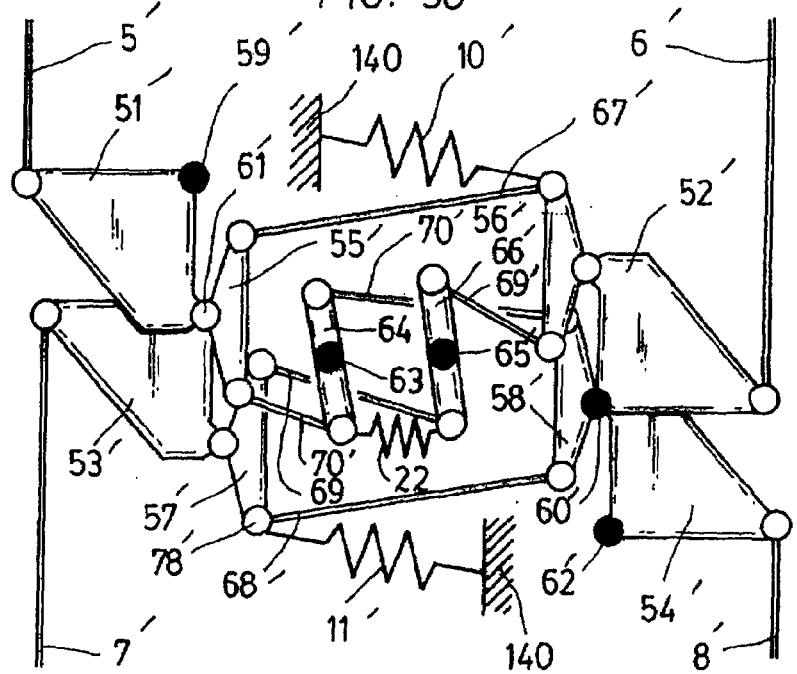
FIG. 38 is a schematic representation of the central device CD according a mechanical system solution of type T-X where it combines the mechanisms of FIG. 33.

FIG. 38 is a schematic representation of a possible constructive solution of the central device CD in a mechanical suspension system, according to the general scheme shown in FIGS. 28, 29 and 30 that kinematically links the transversely and diagonally opposed wheels vertical movements.

In this central device CD, the four connecting links 5', 6', 7' and 8' are connected to one of the arms that are arranged transversely of the angled levers 51', 52', 53' and 54' that rotate around vertical axes 59', 60', 61' and 62' fixed to the vehicle body as it is shown in the figure.

Each one of the angled levers 51', 52', 53' and 54' have the other arm articulated with a balance beam 55', 56', 57' and 58', and these balance beams are connected to each other in a way that every angled lever receive a kinematic relationship with the two levers of the opposite side.

The balance beams use one of the arms to perform a transversal connection, so the balance beams 55' and 56' have one of their arms linked through a connecting rod 67', and the other two balance beams 57' and 58' have one end linked to the articulated rod 68'. In this way, each balance beam 55', 56', 57' and 58' have the end of one arm linked to and end of the arm of the transversely opposed balance beam.

The other arm of every balance beam 55', 56', 57' and 58' is connected to the diagonally opposed balance beam. To that end, the second arm of balance beam 55' is linked to the balance beam 58' through articulated rods 70' and 70", and these in turn are linked through the balance beam 64' that rotates around the axis 63' that is fixed to the vehicle body. Balance beam 64' is needed to invert the movement in the diagonal connection case, because it is intended that the movement transmitted to the balance beams arm that is in charge of the diagonal connection creates an equal movement in the diagonally opposed connecting links 5' and 8'. In the other hand, and with the purpose of creating the same connection in the other diagonal, the second balance beam 56' arm is linked to balance beam 57' through the articulated rods 69' and 69" that in turn are linked through the balance beam 66' that rotates on the 65' axis fixed to the vehicle body.

Balance beams 64' and 66' are connected to each other through an elastic element 22'. This element is not compressed with the axle crossing because the two balance beams would move in parallel then. Nevertheless, its compression or elongation is related with the vertical rebound movement. In fact, the element 22' can be substituted with either a rigid articulated rod or mount the two balance beams 64' and 66' on a single axis 63' that is fixed to the vehicle body. In such a case, the elastic component related to vertical movement would be proportional to the elastic elements 10' and 11' that are related with the movements of the front and rear groups respectively.

It is to be noted that axis 59' and 61' where angled levers 51' and 53' rotate about, can be coincident if the respective mechanical sets are placed in two parallel planes. In such a case, axis 60' and 62' could also coincide and the balance beams 64' and 66' would have to be implemented so that an arm would connect the upper and lower planes in such a way that articulated rods 68', 69' and 70' would be arranged in the plane where balance beams 57' and 58' are, and the articulated rods 67', 69'' and 70'' would be arranged in the plane where the balance beams 55' and 56' are.

When we consider the balance beams 64' and 66' still, the spring 10' connected between the vehicle body and the articulation 77' opposes to the simultaneous movement of angled levers 51' and 52'. With this opposition, spring 10' is actually opposing to the movement of connecting links 5' and 6' together and in the same direction so they can get closer or farther to the central device CD at the same time, and therefore to the vehicle front side vertical movement.

The spring 11' connected to articulations 57' and 72' acts independently and in a similar way on the vehicle rear side.

It is to be observed that this device behaves in an elastic way both to the vehicle pitch movement thanks to the elasticity of elements 10' and 11', as well to the vertical rebound movement thanks to 10', 11' and 22', being rigid to roll. The axle crossing is free as long as there are no restrictions to the rotation of balance beams 64' and 66'.

Figure 39:
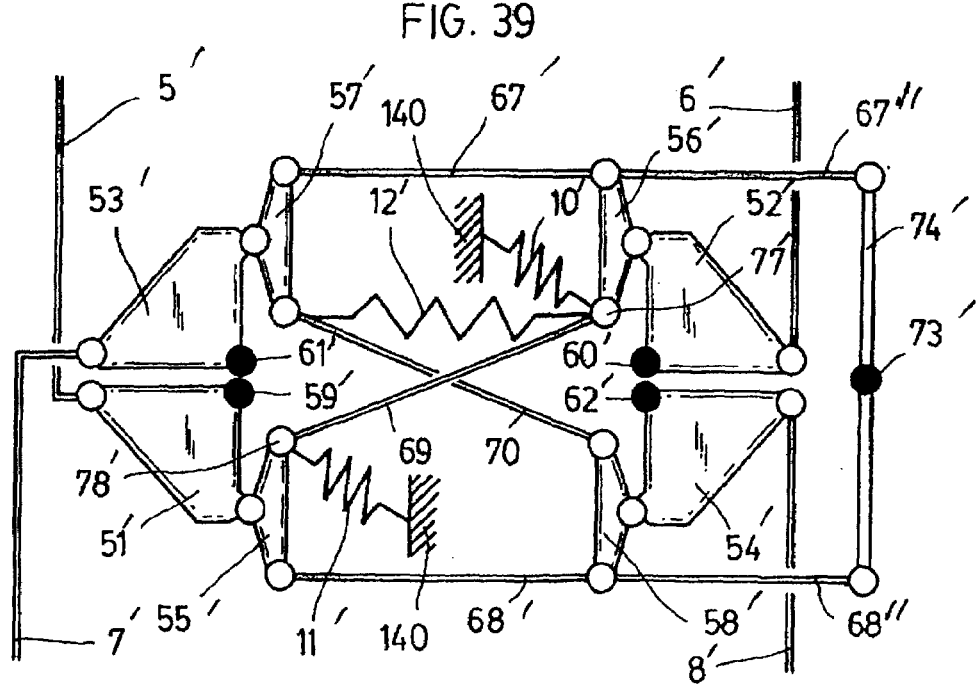
FIG. 39 is a schematic representation of the central device CD according to a mechanical system solution of the system of type T-X that is equivalent to the one shown in FIG. 37.

FIG. 39 is a schematic representation of a possible constructive solution of the central device CD in a mechanical suspension system, according to the general scheme shown in FIGS. 28, 29 and 30 that kinematically links the transversely and diagonally opposed wheels vertical movements.

In this central device CD, the four connecting links 5', 6', 7' and 8' are connected to one of the arms that are arranged transversely in the angled levers 51', 52', 53' and 54' that rotate around vertical axes 59', 60', 61' and 62' fixed to the vehicle body as it is shown in the figure.

Each one of the angled levers 51', 52', 53' and 54' have the other arm articulated with a balance beam 55', 56', 57' and 58', and these balance beams are connected to each other in a way that every angled lever receive a kinematic relationship with the two levers of the opposite side.

The balance beams use one of their arms to implement a diagonal connection in a way that balance beams 57' and 56' have one end of their arms linked by the articulated rod 67', and the other two balance beams 55' and 58' have one end linked to the articulated rod 68'. In this way, each balance beam 55', 56', 57' and 58' has one arm's end connected to one end of the diagonally opposed connecting link corresponding balance beam. Additionally, both diagonal sets are linked by articulated rods 67' and 68' that link one end of rods 67'' and 68'' to the ends of a balance beam 74' that rotates on a vertical axis 73' that is fixed to the vehicle body, so it forces the opposite movement between each set of balance beams corresponding to each diagonal.

The articulate rods 67'' and 68'' can be substituted by elastic elements, so the diagonal relationship has some elasticity susceptible to absorb only vehicle vertical movements.

The other arm of every balance beam 55', 56', 57' and 58' is connected to the transversely opposed balance beam. To such effect, the second arm of the balance beam 57' is linked to the balance beam 58' through an articulated rod 70' given the angled levers 51' and 52' layout since the aim is that the movement transmitted to the arm of the balance beams in charge of the transversal connection creates an equal movement in the front transversely opposed connecting links 5' and 6'. In the other hand, and to implement the same connection between the other two balance beams corresponding to rear connecting links, the second arm of balance beam 55' is linked to balance beam 56' through the articulated rod 69'.

Balance beams 57' and 56' are connected to each other through an elastic element 12'. This element is not compressed with the axle crossing because in such a case, the ends of balance beams 55', 56', 57' and 58' connected to the articulated rods 69' and 70' will perform a minimal movement. Its compression or elongation is related with the roll movement. In fact, the element 12' can be suppressed. In that case, the pitch movement would be proportional to elastic elements 10' and 11' that are related with every of the movements in the front and rear sets respectively.

It is to be noted that axis 59' and 61' where the angled levers 51' and 53' rotate can coincide if the respective mechanical sets are placed on two parallel planes. In such case, axis 60' and 62' would also coincide, and the balance beam 74' would have to be implemented in such a way that one arm is connected in the upper plane, and the other in the lower, in such a way that articulated rods 67' and 67'' are arranged in the plane where balance beams 57' and 56' are found, and the articulated rods 68 and 68' are in the plane where balance beams 55' and 58' are found. Rods 69' and 70' would then cross over to connect the balance beams on both levels.

If we consider the balance beam 74' still, the spring 10' connected between the vehicle body and the articulation 77' would oppose to the simultaneous movement of angled lever 51' and 52'. With this opposition, spring 10' is opposing in the end to the movement of connecting links 5' and 6' together and in the same direction that can either get closer or farther together from the central device CD, and therefore to the vehicle front vertical movement.

Spring 11' connected between the vehicle body and articulation 78' acts independently and in a similar way on the vehicle rear side.

It is to be observed that this device behaves in an elastic way to both the vehicle pitch and vertical rebound movements thanks to the elasticity of elements 10 and 11', being rigid to roll. The axle crossing is then free as long as there are no restrictions to the balance beam 74' rotation.

Figure 40:
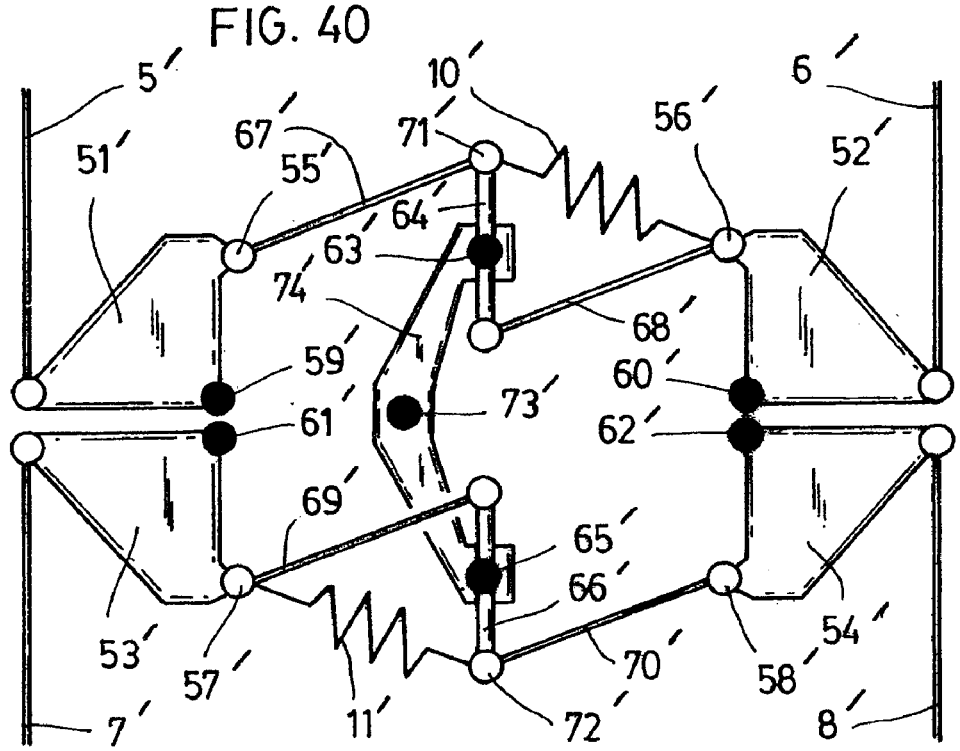
FIG. 40 is a schematic representation of the central device CD according a mechanical solution of the system type T-X equivalent to the one shown in FIG. 38.

FIG. 40 is a schematic representation of a possible constructive solution of the central device CD in a mechanical suspension system, according to the general scheme shown in FIGS. 28, 29 and 30 that kinematically links the transversely and diagonally opposed wheels vertical movements.

In this central device CD, the four connecting links 5', 6', 7' and 8' are connected to one of the arms that are arranged transversely of the angled levers 51', 52', 53' and 54' that rotate around vertical axes 59', 60', 61' and 62' fixed to the vehicle body as it is shown in the figure.

The angled levers 51' and 52' are connected to each other through articulated rods 67' and 68' that are connected with the balance beam 64' that rotates on the axis 63' mounted on the end of balance beam 74' that rotates around the axis 73' fixed to the vehicle body. In a similar way, angled levers 53' and 54' are connected to each other through the articulated rods 69' and 70' that are connected to the balance beam 66' that rotates on the axis 65' mounted on the other end of balance beam 74'.

This arrangement, when balance beam 74' is still, forces that the movement of connecting links 5' and 6' that are connected to the angled levers 51' and 52' be always in the same direction of getting closer or farter in respect to the central device CD, and therefore, the vertical movement of respective transversely opposed wheels be in the same direction. Angled levers 53' and 54' create the same kinematic relationship between connecting links 7' and 8' and in a similar way force that the respective also diagonally opposed wheels vertical movements are in the same direction.

When balance beam 74' rotates, the mechanical sets connected to balance beams 64' and 66' move transversely and in opposite directions, so connecting links 5' and 8' get closer or farther together in respect to the central device CD, and connecting links 6' and 7' do the same but opposed to the movement of connecting links 5' and 8'. This kinematic relationship implies that wheels that are in a vehicle diagonal move in the same vertical direction, and the others in the other diagonal move together but in the opposed direction.

It is to be noted that axis 59' and 61' where the angled levers 51' and 53' rotate can coincide if the kinematic elements sets linking diagonally opposed wheels are placed in two parallel planes. In such case, axis 60' and 62' should coincide too.

Spring 10', connected to articulations 71' and 56' opposes to the rotation of balance beam 64', and in that way to the opposed movement of articulations 55' and 56' of angled levers 51' and 52' because the articulated rods 67' and 68' are connected to opposite ends of balance beam 64'. With this opposition, spring 10' opposes in the end to the movement of connecting links together and in the same direction that can get closer or farther to the central device CD, and therefore to the vertical movement of the front of the vehicle.

Spring 11', connected to articulations 57' and 72' acts independently on the rear side of the vehicle in a similar way as the spring 10', where balance beam 66' and articulated rods 69' and 70' define the kinematic relationship between articulations 57' and 58' in respect to the balance arm axis 65'.

Spring 10' and 11' can be mounted between the two angled levers articulations where they are currently connected and the working principle will keep the same, because they will oppose to the related movement of elements 51', 64' and 52' on one hand, and 53', 66' and 64' on the other.

It is to be observed that this device behaves in an elastic way both to the vehicle pitch movement as well as the vertical rebound movement, being rigid to roll. Axle crossing is then freed as long as the balance beam 74' can freely rotate around axis 73'. It is possible to add elastic elements or stops in a way that balance beam 74' has a restricted movement in respect to the vehicle body.

Figure 41:
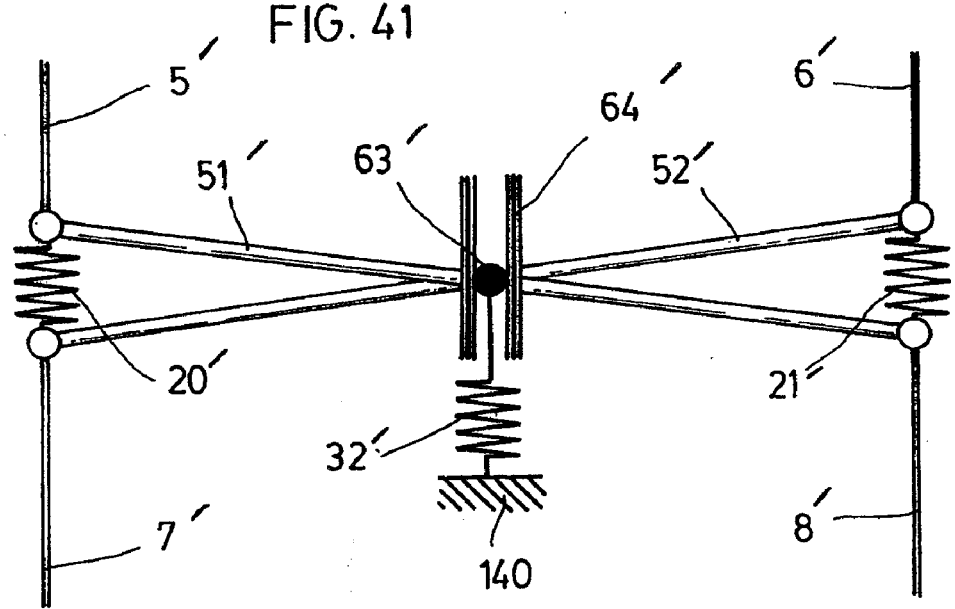
FIG. 41 is a schematic representation of the central device CD according to a mechanical system solution of type T-X equivalent to the one shown in FIG. 32.

FIG. 41 is a schematic representation of a possible constructive solution of the central device CD in mechanical suspension system, according to the general scheme shown in FIGS. 28, 29 and 30 that kinematically links the transversely and diagonally opposed wheels vertical movements.

In this central device CD, the connecting links 5' and 8' are connected to the ends of the balance beam 51', and the connecting links 6' and 7' to the ends of the balance beam 52. Both balance beams rotate on a vertical axis 63' that has the movements restricted within a guide 64' arranged longitudinally, and connected to an elastic element 32' mounted between the balance beam axis 63' and the vehicle body.

When the axis 63' is still in its guide, the balance beam 51' creates a kinematic relationship between the connecting links 5' and 8', and therefore forces that the vertical movement of the respective diagonally opposed wheels be in the same direction. In the same way, balance beam 52' creates a kinematic relationship between connecting links 6 and 7, and therefore forces that the respective diagonally opposed wheels vertical movements be in the same direction. The elastic elements 20' and 21' relate therefore the movements of the two diagonal sets connected through balance beams 51' and 52' in a way that they get compressed or elongated under the movements of getting closer or farther together of connecting links 5', 6', 7' and 8 in respect to the central device CD. Nevertheless, the arrangement where the balance beams 51' and 52' can freely rotate without restrictions in respect to the vehicle body does not oppose to the opposed movement between diagonal groups, 5' and 8' in respect to 6' and 7'.

Nevertheless, when the four connecting links 5', 6', 7' and 8' move together in the same direction, movement related with the vehicle pitch, the axis 63' of balance beams 51' and 52' moves, and the elastic element 32' compresses or elongates, adding therefore its own elasticity to the elastic elements found in the mechanical means where the connecting links 5', 6,' 7' and 8' relate with the vertical movement of each wheel support.

It is to be observed that this device behaves in an elastic way to the vertical rebound movement, and to the vehicle pitch movement, being rigid to roll. Axle crossing, related with the simultaneous rotation of balance beams 51' and 52' is therefore free.

Figure 42:
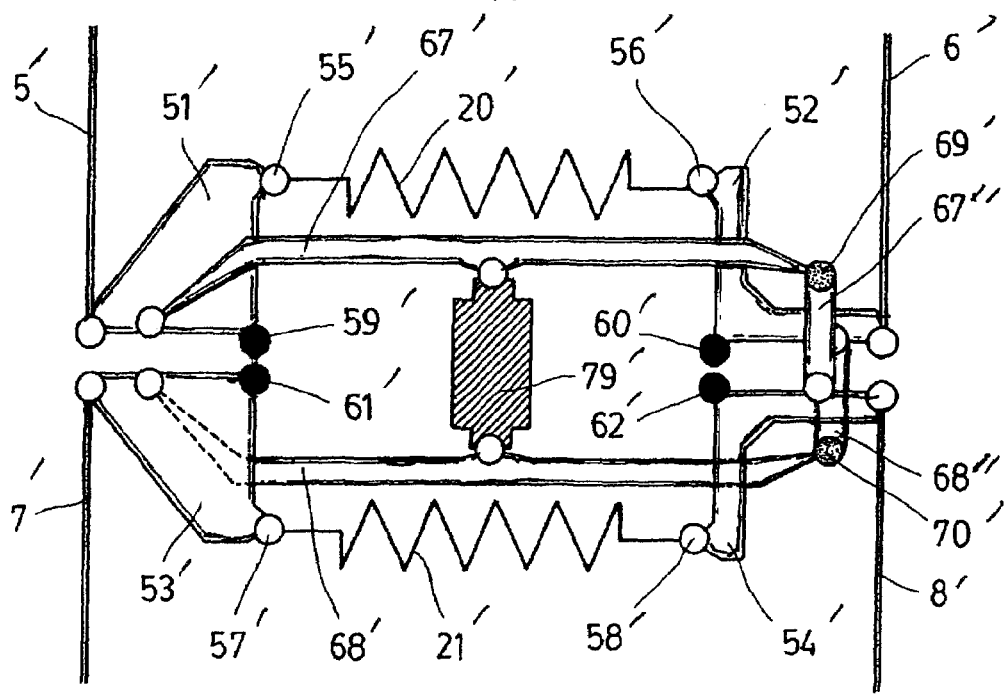
FIG. 42 is a schematic representation of the central device CD according to a mechanical system solution where each connecting link of the transmission means is connected to an angled lever, being these angled levers connected in pairs through elastic elements, and related through connecting rods linked to each other by an element that can be an actuator.

FIG. 42 is a schematic representation of a possible constructive solution of the central device CD in a mechanical suspension system where every connecting link from the transmission means is connected to the end of an angled lever that converts the longitudinal movements into transversal movements, in such a way that the front angled levers are connected through an elastic element 20' arranged transversely, and the rear angled levers to a similar one 21'. Such elastic elements are susceptible to modify its length when the wheels where the corresponding angled levers are connected move in the same direction, but not when move in opposite directions.

Angled levers corresponding to diagonally opposed connecting links are linked to each other through balance beams 67' and 68', which ends are connected near the connection point with the connecting links 5', 6', 7' and 8' related to the wheels through an articulation or a small lever 67" and 68" connected on one end of the balance beam 69' and 70'. The two balance beams 67' and 68' are connected to each other through a rigid element 79' articulated between the middle points of the two balance beams.

The element 79' connected between the balance beams 67' and 68' can be built with and actuator because its length variation would modify the position of the vehicle in respect to a longitudinal axis, and therefore can be used to counteract the vehicle roll.

Figure 43:
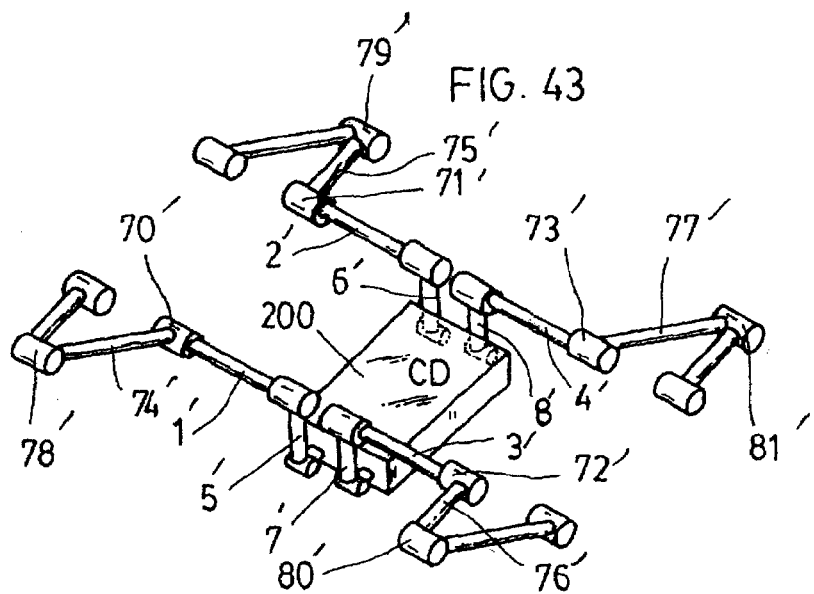
FIG. 43 is a schematic representation of a suspension system where the transmission means are made by the suspension arms connected to torsion bars that transmit the movement to the central device CD, where a small levers transform the rotation movement of the torsion bars into horizontal movements in the transverse direction linked to moving parts in the central device CD.

FIG. 43 is the schematic representation of a mechanical suspension device where every wheel support 78', 79', 80' and 81' is connected to a central device CD 200 by means of an elastic element made of torsion bars 1', 2,' 3' and 4' and between the suspension arms 74', 75', 76' and 77' and the levers 5', 6', 7' and 8' connected to the central device CD.

In this layout the movement of every wheel, mainly in a vertical direction, is transformed into a rotation of the end of the mechanical means such as a torsion bar 1', 2', 3' and 4' that arranged longitudinally transmit this rotation up to the central device CD 200, which they are connected to through a lever 5', 6', 7' and 8'. In this figure, the elastic element 1, 2, 3 and 4 is between the suspension arm 74', 75', 76' and 77' linked to the wheel support 78', 79', 80' and 81', and the axis of a lever 5', 6', 7' and 8' that has its end connected to the central device CD. In this way, the elastic element absorbs part of the wheel oscillations before transmitting such movement to the mechanical devices linked to the central device CD. The suspension arms 74', 75', 76' and 77' take care of transforming the wheels vertical movement into a rotation of the end of the elastic elements 1', 2', 3' and 4', and the levers 5', 6', 7' and 8' take care of converting such rotation in the opposite end of such elastic elements into horizontal movements transmitted to the central device CD 200.

It is assumed that the elastic element 1', 2', 3' and 4' arranged between the wheel movement 78', 79', 80' and 81' and the central device CD 200 can be integrated in the suspension arm itself 74', 75', 76' and 77' that converts the vertical movement into a rotation, or in the levers 5', 6', 7' and 8' that transmit the rotation into the horizontal movement that is received in the central device CD.

Figure 44:
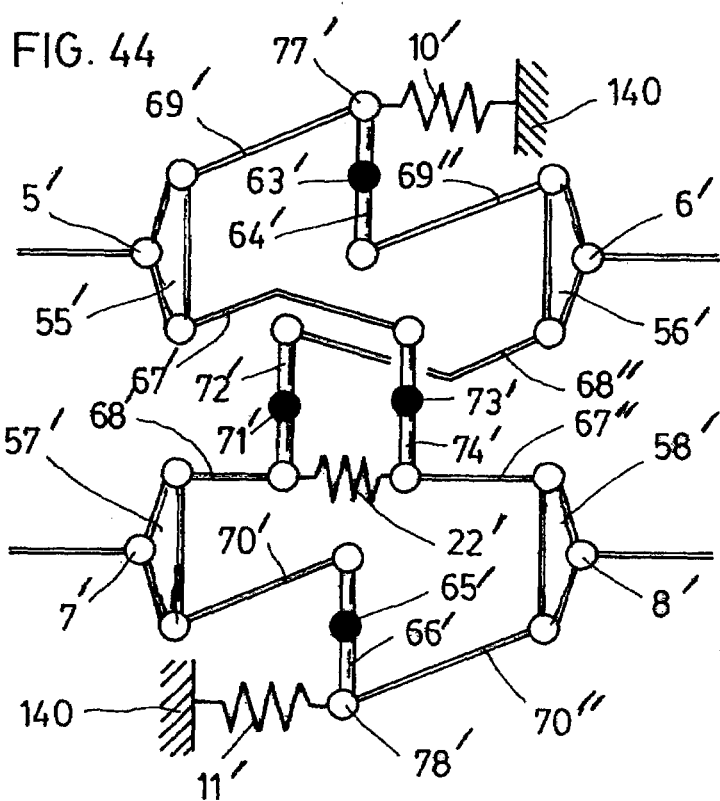
FIG. 44 is a schematic representation of the central device CD according to a mechanical solution of the system of type X-T where the central device CD receives the movements from the wheels through torsion bars.

FIG. 44 is a schematic representation of a possible constructive solution of the central device CD in a mechanical suspension system, according to the general scheme shown in FIG. 43 that kinematically links the transversely and diagonally opposed wheels vertical movements through a central device CD. This figure represents the mechanical elements in arranged in a horizontal plane.

In this central device CD, the movement is received in a transversal direction on the articulations 5', 6', 7' and 8'. The axis of balance beams 55', 56', 57' and 58' are articulated on these, having the ends articulated with the rest of mechanical elements. Each balance beam has one end connected to the end of a transversely opposed balance beam through an intermediate balance beam 64' and 66', and the other end with an end of the diagonally opposed balance beam through an intermediate balance beam 72' and 74', in such a way that it relates the movements of each wheel with the diagonally and transversely opposed ones.

The transverse relationship is transmitted from balance beams 55' and 57' on the left side, to the balance beams 64' and 66' respectively, that rotate around axis 63' and 65' fixed to the vehicle body by means of articulated rods 69' and 70', and from these intermediate balance beams to the ones at the right side by means of articulated rods 69'' and 70''. This mechanism makes the end of the lateral balance beams connected to the intermediate ones 64' and 66' move in opposite directions, the one in 55' in respect to the one in 56', and the one in 57' in respect to the one in 58'.

The elastic element 10' is mounted between one end 77' of the balance arm 64' and the vehicle body, while the elastic element 11' is mounted between one end 78' of the balance beam 66' and the vehicle body. It is possible to mount the elastic elements 10' and 11' between any other two articulations in such a way that they oppose to the rotation of balance beams 64' and 66', so each elastic element provides the elasticity related with the front side movement through the elastic element 10', and the rear side movement through the elastic element 11'.

The diagonal relationship is transmitted from the balance beams 55' and 57' placed to the left side to the balance beams 74' and 72' respectively, that rotate around axis 73' and 71' fixed to the vehicle body through the articulated rods 67' and 68', and from these intermediate balance beams to the ones at the right side through the articulated rods 67'' and 68''. This mechanism forces the end of lateral balance beams connected to the intermediate ones 74' and 72' to move in opposite directions, the 55' in respect to the 58', and the 57' in respect to the 56'. The elastic element 22' relates the rotation of both balance beams 74' and 72' in such a way that it is compressed when the two diagonal sets move in the same direction. Nevertheless, it allows the free movement when they move in opposite direction.

The elastic element 22' can be substituted by a rigid articulated rod, or just suppressed if balance beams 72' and 74' are joined in a single piece that rotates around a vertical axis 71'.

If we consider the balance beams 72' and 74' to be still, the elastic element 10' opposes tot the opposite movement between articulations 5' and 6', while the elastic element 11' opposes to the opposite movement of articulations 7' and 8'. The spring 11 connected between the vehicle body and the articulation 78' is works independently and in a similar way on the vehicle rear side.

If we consider the balance beams 64' and 66' still, the balance beams 72' and 74' allow the movement of two diagonals together. Precisely, the rotation of balance beam 72' allows the movement in the same direction of articulations 6' and 7', while the balance beam 74' relates the articulations 5' and 8' in the same way. When both balance beams 72' and 74' rotate in the same direction, the diagonal sets move in opposite directions one in respect to the other freely without to compress the elastic element 22'. When they rotate in opposite directions the elastic element 22' is compressed or elongated, and the four vehicle wheels move in the same direction. Therefore, the spring 22' is related to the vertical movements of the vehicle.

It is to be observed that this device behaves elastically both to vehicle pitch movement thanks to elastic elements 10' and 11', as well as vertical rebound movement thanks to elements 10', 11' and 22', while it is rigid to roll. The axle crossing is free as long as there are no restrictions to the rotation of balance beams 72' and 74'.

Figure 45:
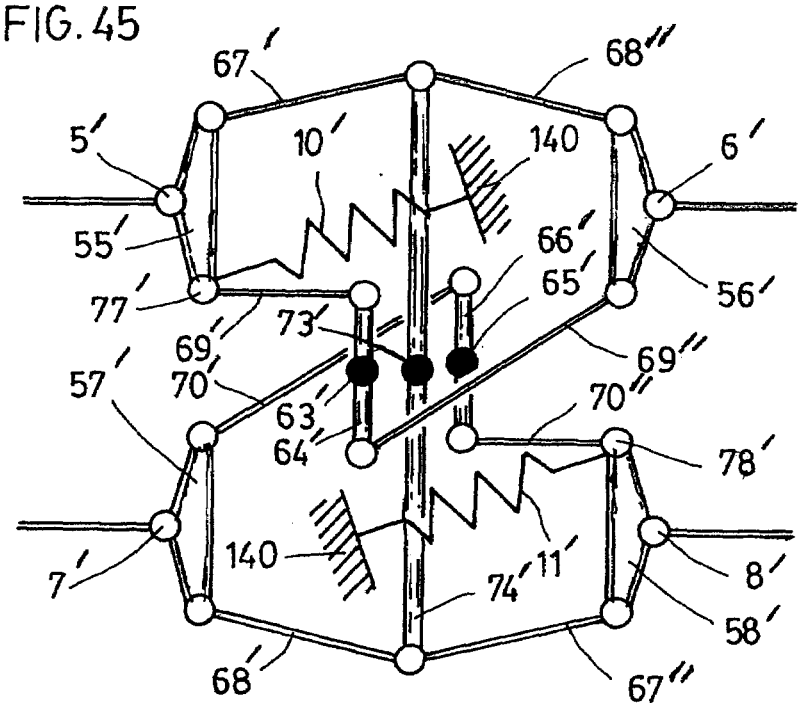
FIG. 45 is a schematic representation of the central device CD according to a mechanical solution that is equivalent to the one in FIG. 44, and similar to the one in FIG. 39.

FIG. 45 is a schematic representation of a possible constructive solution of the central device CD in a mechanical suspension system, according to the general scheme shown in FIG. 43, in particular the one shown in FIG. 44, that kinematically links the transversely and diagonally opposed wheels vertical movements through a central device CD. This figure represents the mechanical elements in arranged in a horizontal plane.

This figure represents the elements in FIG. 44 with the particularity that balance beans 72' and 74' have been joined together in a single one 72' and the balance beams 64' and 65' have been arranged between the nearest ends of 55', 56', 57' and 58' in a way that the axis 63', 65' and 73' can be placed on the same axis, thus simplifying the device construction.

As in FIG. 44, this device behaves elastically in respect to both itch movement and the vertical rebound movement thanks to the elasticity of elements 10' and 11'. The axle crossing is free as long as there are no restrictions to the rotation of balance beam 74'.

Figure 46:
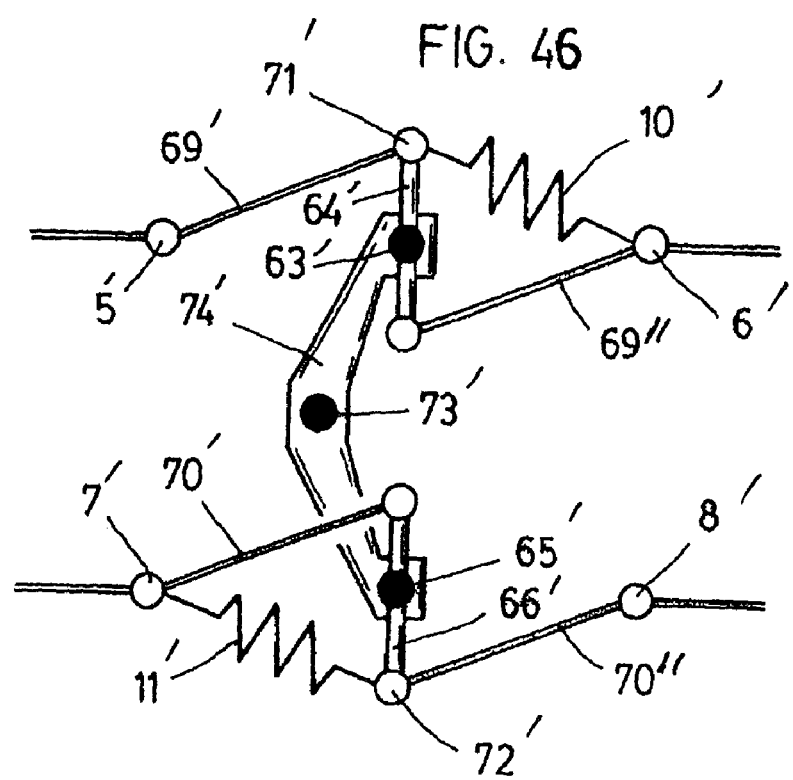
FIG. 46 is a schematic representation of the central device CD according to a mechanical solution of type X-T that is equivalent to the one presented in FIG. 40 after suppressing the angled levers.

FIG. 46 is a schematic representation of a possible constructive solution of the central device CD of a mechanical suspension system according to the general scheme shown in FIG. 43 that consists in kinematically link the vertical movements of both diagonally or transversely opposed wheels.

In this device, the four articulations 5', 6', 7' and 8' are connected to two balance beams 64' and 66' that rotate on axis 63' and 65' that are mounted on the ends of a central balance beam 74' that in turn rotates on the axis 73' that is fixed on the vehicle body.

Each articulation 5', 6', 7' and 8' is connected to an articulated rod 69', 69'', 70' and 70'' respectively. Rods 69' and 69" are then forced to move in the opposite direction. In this way, the balance beam 64' is related with the parallel movement of articulations 5' and 6', and in this way with the front wheels vertical movement together. The elastic element 10' opposes to such movement and provinces the necessary elasticity that is related with the vertical movement of front wheels together. In the same way, rods 70' and 70" are articulated on the balance beam 66' ends in a way that when the axis 65' is kept still, the articulations 7' and 8' are forced to move in opposite directions. The elastic element 11' opposes to such movement and provides the needed elasticity related with the vertical movement of rear wheels together.

Balance beam 74' relates the position of axis 63' and 65' mounted on its ends. When balance beam 74' rotates, the mechanical sets connected to balance beams 64' and 66' move transversely and in the opposite directions, so the connecting links 5' and 8' get closer or farther the same in respect to the central device CD, and connecting links 6' and 7' move the same but in the opposite direction than connecting links 5' and 8'. This kinematic relationship implies that wheels found in a vehicle diagonal move in the same vertical direction and those in the other diagonal move also together but in the opposite direction. This way it is possible to free the antiparallel movements of front and rear sets, thus the axle crossing movement.

The elastic element 10' can also be mounted between articulations 5' and 6', or between the axis 63' and any of them. In the same way, the elastic element 11 can be mounted between 7' and 8', or between 65' and any of these two articulations.

It is to be observed that this device behaves in elastic way both for the vehicle pitch movement as well as for the vertical rebound movement, being rigid to roll. The axle crossing is then freed as long as balance beam 74' can rotate freely around axis 73'. It is possible to add elastic elements or stops so that the balance beam 74 has a restricted movement in respect to the vehicle body.

Figure 47:
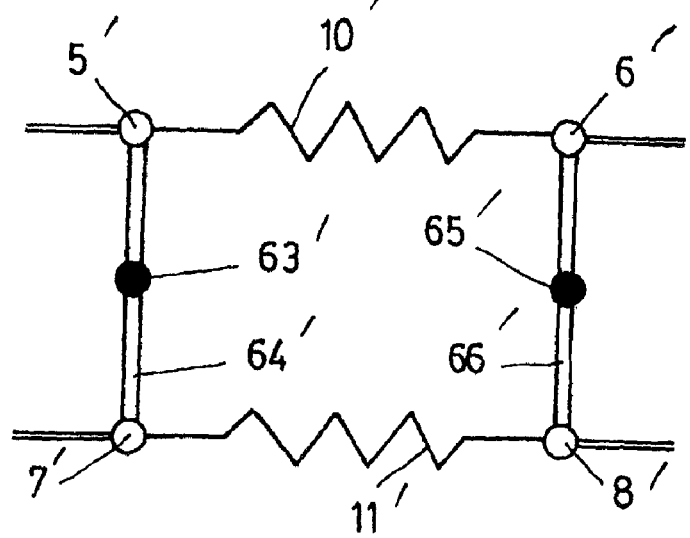
FIG. 47 is a schematic representation of the central device CD according to a mechanical solution of type X-L that is equivalent to the one shown in FIG. 35.

FIG. 47 is a schematic representation of a possible constructive solution of the central device CD of a mechanical suspension system according to the general scheme shown in FIG. 43 that consists in kinematically link the vertical movements of both diagonally or transversely opposed wheels.

In this device, the four articulations 5', 6', 7' and 8' are connected to two balance beams 64' and 66' that rotate on axis 63' and 65' that are fixed to the vehicle body. The elastic element 10' is placed between articulations 5' and 6', and the elastic element 11' between articulations 7' and 8'.

The balance beams 64' and 66' arrangement forces that the articulations 5' and 7' move in opposite directions. In the same way, it relates articulations 6' and 8' through the balance beam 68'. The elastic elements 10' and 11' allow a rotation of the two balance beams in the same direction, but oppose to the rotation in the opposite direction. In this way it is allowed that the diagonally opposed articulations 5' and 8' can move in the same direction, and 6' and 7' in the other direction without compressing or elongating the elastic elements 10' and 11'.

It is to be observed that this device behaves elastically only to the vehicle pitch movement, while it behaves rigid in respect to vertical rebound and roll. The axle crossing is freed as long as the balance beams 64' and 66' can rotate around their axis. It is possible to add elastic elements or stops so that the balance beams 64' and 65' have a restricted movement in respect to the vehicle body.

Figure 48:
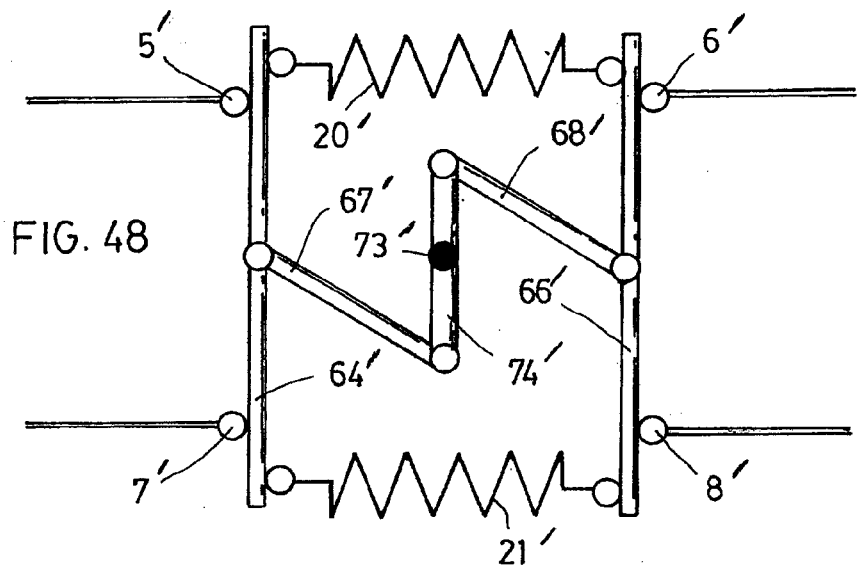
FIG. 48 is a schematic representation of the central device CD according to a mechanical solution that is equivalent to the one shown in FIG. 46.

FIG. 48 is a schematic representation of a possible constructive solution of the central device CD of a mechanical suspension system according to the general scheme shown in FIG. 43, which construction is similar to FIG. 47, where each torsion bar longitudinally arranged between the central device CD and every wheel is connected to a small vertical lever that transmits the rotation movement into a transverse movement if its end connected to the corresponding end of beam 64' and 66' on the same side of the vehicle, near the joint with the corresponding transverse elastic element 20' or 21', while such longitudinal beams are connected at their middle point to the central balance beam 74' that rotates on the vehicle body through the levers 67' and 68' arranged between the ends of such balance beam and the longitudinal beams 64' and 66'.

The arrangement of beams 64' and 66' allows the same movements such as in FIG. 47, with the addition that the central mechanism made of the balance beam 74' and the rods 67' and 68' make it easy the opposite movement of beams 64' and 65', which permits the vertical movement of the vehicle body, movement that the device shown in FIG. 47 does not allow. Such movement takes place with the opposition of the elastic elements 20' and 21'. It is to be noted that the elastic elements 20' and 21' define the elastic characteristic of vertical movement and pitch, although pitch will also depend on the position of the joining at the ends of beams 64' and 66'. Because of that, this device makes it easy to design a different characteristic for the pitch and the vertical movement. If the elastic elements are connected to the beams 64' and 66' in a point farther than the joint with the connecting rods of torsion bars 5', 6', 7' and 8', the system shows more rigidity to pitch than to vertical movement, while if such points are nearer than the point where connecting rods 67' and 68' pitch is less rigid without modifying the resistance to vertical movement.

Figure 49:
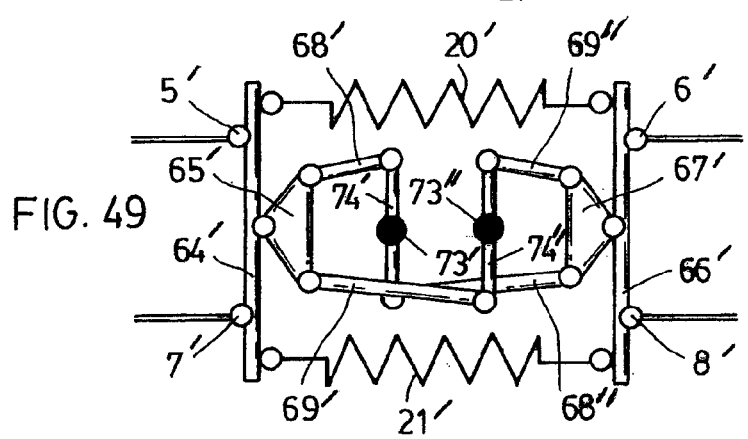
FIG. 49 is a schematic representation of the central device CD according to a mechanical solution that is equivalent to the one shown in FIG. 46.

FIG. 49 is a schematic representation of a possible constructive solution of the central device CD of a mechanical suspension system similar to FIG. 48, where the central balance beam is doubled in two balance beams 74' and 74" that rotate on the vehicle body in points 73' and 73", and connect their ends to articulated rods 68 and 68' one of the balance beams, and 69' and 69" the other balance beam. Such articulated rods are connected in their other end to each of the balance beams 65' and 67' which axis is mounted on the middle point of beams 64' and 66' in such a way that each center balance beam 74' and 74" is connected in one end to the balance beam of one side 65' and in the other end to the balance beam of the other side 67', in a way that the set of central balance beams 74' and 74", the articulated rods connected at 68', 68", 69' and 69" and the lateral balance beams 65' and 67' force the longitudinal beams 64' and 66' middle points to move always in the opposite direction along the transverse direction.

Figure 50:
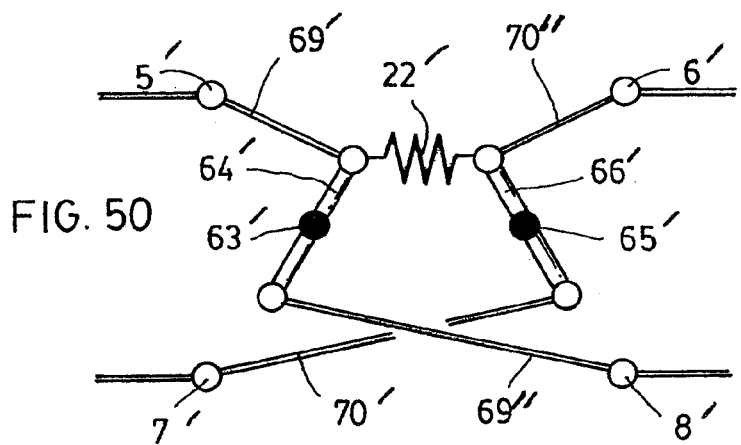
FIG. 50 is a schematic representation of the central device CD according to a mechanical solution of type X that is equivalent to the one shown in FIG. 21.

FIG. 50 is a schematic representation of a possible constructive solution of the central device CD of a mechanical suspension system according to a general scheme shown in FIG. 43 that consists in kinematically link the vertical movements of diagonally and transversely opposed wheels In this central device CD, the four articulations 5', 6', 7' and 8' are connected to two balance beams 64' and 66' that rotate on axis 63' and 65' mounted on the vehicle body through articulated rods 65', 70', 69' and 70". The elastic element 22' is arranged between the balance beams 64' and 66' in a way that it allows that they rotate in the same direction, although it opposes to they moving in the opposite direction.

The arrangement of balance beam 64' forces that articulations 5' and 8' move in the same direction and articulation 6' and 7' are related in the same way through balance beam 66'. The elastic element 22' allows the rotation of the two balance beams in the same direction, so the antiparallel of the diagonal sets of articulations 5' and 8' on one hand, and 6' and 7' on the other is free.

It is to be noticed that this device behaves in an elastic way only to the vertical rebound movement, while it does it rigidly in respect to the pitch and roll movements. The axle crossing is then free as long as balance beams 64' and 66' can rotate freely around their axis. It is possible to add elastic elements or stops in a way that balance beams 64' and 66' have a restricted movement in respect to the vehicle body.

The invention claimed is:

1. Suspension device for a vehicle provided with four rolling arrangements, wherein the suspension device cooperates with or substitutes for an existing suspension and defines a kinematic and dynamic relationship between vertical movements of each rolling arrangement, said vertical movements including opposition to roll, pitch, vertical rebound, and axle crossing movement, in order to allow a weight distribution on every rolling arrangement, wherein said rolling arrangements comprise cylinders of simple effect which pistons are not provided with choke valves, said cylinders being connected by their single fluid containing chamber to a central device (CD) by fluid conduits;

wherein the central device is attached to the vehicle body, receives forces originated in each rolling arrangement, and interacts with and transmits the forces selectively to one or more rolling arrangements, either in a direct or indirect way, the central device comprises two diagonal arrangement elements, each diagonal arrangement element comprising two different diameter double pistons that can freely move inside co-centric cylinders, comprising cylinders equal in diameter to the double pistons, wherein the co-centric cylinders define three cavities, an end cavity of a larger diameter side that is connected to an expansion chamber and two cavities that are respectively connected to diagonally opposed rolling arrangements;

wherein the end cavities of each of the diagonal arrangements are connected to one another through a valve.

2. The suspension device as set forth in claim 1, wherein each said rolling arrangement comprises a hydraulic cylinder operative to provide elasticity to a respective wheel and being hydraulically coupled to said central device, and wherein said valve is controllable between an open and closed condition to provide isostaticity to said system.

3. The suspension device as set forth in claim 1, wherein said central device further comprises two transverse arrangement elements, a first element comprising a different diameter double piston that can freely move inside a co-centric cylinder, comprising two cylinder chambers substantially equal in diameter to the double pistons, wherein the co-centric cylinders define three cavities, including an end cavity of a larger diameter that is connected to an expansion chamber and two cavities that are respectively connected to transversely opposed rolling arrangements, and a triple piston device having a common cylinder with three co-centric chambers and three coaxially arranged pistons, each mounted for free movement within a respective chamber and together defining four cavities, said pistons including a larger diameter central piston and two adjacent smaller pistons, said larger piston defining two central cavities and said smaller pistons each defining a respective end cavity, a first end cavity being connected to the one transversely opposed rolling arrangement and a first central cavity being connected to another transversely opposed rolling arrangement, a second central cavity being coupled to an expansion chamber, and a second end cavity being coupled to said end cavity of a larger diameter in said double piston device.

4. The suspension device as set forth in claim 1, wherein said central device further comprises two elements, each comprising a cylinder and a piston that divides said cylinder into two cavities, each said piston being moveable inside the corresponding cylinder and being biased by elastic elements that allow the pistons movement when the pressure in one cavity is larger than in the other, each cavity being connected to longitudinally opposed rolling arrangements.

5. The suspension device as set forth in claim 1, wherein each of said rolling arrangements comprises a double effect hydraulic cylinder having an upper cavity and a lower cavity, the upper cavity of each transversely arranged cylinder being coupled to a lower cavity of the other transversely arranged cylinder.

6. The suspension device as set forth in claim 1, wherein said central device further comprises two double piston devices, each comprising a different diameter double piston that can freely move inside a co-centric cylinder, comprising two cylinder chambers substantially equal in diameter to the double pistons, wherein the co-centric cylinders define three cavities, including an end cavity of a larger diameter that is connected to an expansion chamber and two cavities that are respectively connected to transversely opposed rolling arrangements, said two double piston devices being connected to each other by means of a rod that links the two double pistons, in such a way the two devices are united together in a single four pistons device, the two end pistons of smaller diameter than the two central pistons, defining six cavities connected such that:

a) the two cavities separated by the smaller diameter piston at one end of the four piston device being connected to a first pair of transverse rolling arrangements, b) the two cavities separated by the other smaller diameter piston at the other end of the four piston device being connected to a second pair of transverse rolling arrangements, and c) the two cavities between the two larger diameter pistons that have the rod that links said double pistons being connected to respective expansion chambers.

7. Suspension device as set forth in claim 1, wherein said central device further comprises two transverse arrangement elements, each transverse arrangement element comprising two different diameter double pistons that can freely move inside co-centric cylinders, comprising cylinders equal in diameter to the double pistons, wherein the co-centric cylinders define three cavities, and end cavity of a larger diameter that is connected to an expansion chamber and two cavities that are respectively connected to transversely opposed rolling arrangements.

8. Suspension device for a vehicle provided with four rolling arrangements, wherein the suspension device cooperates with or substitutes for an existing suspension and defines a kinematic and dynamic relationship between vertical movements of each rolling arrangement, said vertical movements including opposition to roll, pitch, vertical rebound, and axle crossing movement, in order to allow a weight distribution on every rolling arrangement, wherein said rolling arrangements are connected to a central device (CD) by fluid conduits;

wherein the central device is attached to the vehicle body, receives forces originated in each rolling arrangement, and interacts with and transmits the forces selectively to one or more of the rolling arrangements, either in a direct or indirect way, the central device comprises two diagonal arrangement elements, each diagonal arrangement element comprising two different diameter double pistons that can freely move inside co-centric cylinders, comprising cylinders equal in diameter to the double pistons, wherein the co-centric cylinders define three cavities, an end cavity of a larger diameter side that is connected to an expansion chamber and two cavities that are respectively connected to diagonally opposed rolling arrangements;

wherein the end cavities of each of the diagonal arrangements are connected to one another through a valve, and wherein said central device further comprises two transverse arrangement elements, each transverse arrangement element comprising two different diameter double pistons that can freely move inside co-centric cylinders, comprising cylinders equal in diameter to the double pistons, wherein the co-centric cylinders define three cavities, and end cavity of a larger diameter that is connected to an expansion chamber and two cavities that are respectively connected to transversely opposed rolling arrangements.

* * * * *